(12) United States Patent
Jannard et al.

(10) Patent No.: US 8,159,579 B2
(45) Date of Patent: Apr. 17, 2012

(54) HIGH DYNAMIC RANGE VIDEO

(75) Inventors: James H. Jannard, Las Vegas, NV (US); Graeme Nattress, Acton, CA (US); Bimal Mathur, Thousand Oaks, CA (US); Uday Mathur, Los Angeles, CA (US); Deanan DaSilva, Hollywood, CA (US); Peter Jarred Land, Los Angeles, CA (US)

(73) Assignee: RED.COM, Inc., Irvine, CA (US)

( * ) Notice: Subject to any disclaimer, the term of this patent is extended or adjusted under 35 U.S.C. 154(b) by 0 days.

(21) Appl. No.: 13/279,071

(22) Filed: Oct. 21, 2011

(65) Prior Publication Data

US 2012/0044381 A1 Feb. 23, 2012

Related U.S. Application Data

(63) Continuation of application No. 13/215,002, filed on Aug. 22, 2011.

(60) Provisional application No. 61/473,711, filed on Apr. 8, 2011, provisional application No. 61/376,172, filed on Aug. 23, 2010.

(51) Int. Cl.
*H04N 5/228* (2006.01)
*H04N 5/235* (2006.01)
*H04N 3/14* (2006.01)
*H04N 5/335* (2011.01)
*G03B 7/00* (2006.01)

(52) U.S. Cl. ............ 348/296; 348/222.1; 348/229.1; 348/362

(58) Field of Classification Search ........... 348/216.1, 348/222.1, 229.1, 230.1, 333.12, 362, 296
See application file for complete search history.

(56) References Cited

U.S. PATENT DOCUMENTS

| 4,647,975 A | * | 3/1987 | Alston et al. ............. 348/222.1 |
| 5,247,366 A | | 9/1993 | Ginosar et al. |
| 5,420,635 A | | 5/1995 | Konishi et al. |
| 5,517,242 A | | 5/1996 | Yamada et al. |
| 5,929,908 A | | 7/1999 | Takahashi et al. |
| 6,204,881 B1 | | 3/2001 | Ikeda et al. |
| 6,278,490 B1 | | 8/2001 | Fukuda et al. |
| 6,418,245 B1 | | 7/2002 | Udagawa |
| 6,496,226 B2 | | 12/2002 | Takahashi et al. |
| 6,593,970 B1 | * | 7/2003 | Serizawa et al. ............ 348/362 |
| 6,670,993 B1 | | 12/2003 | Yamamoto et al. |
| 6,677,992 B1 | | 1/2004 | Matsumoto et al. |
| 6,707,492 B1 | | 3/2004 | Itani |
| 6,720,993 B1 | | 4/2004 | Hwang et al. |
| 6,847,398 B1 | | 1/2005 | Fossum |
| 6,952,234 B2 | | 10/2005 | Hatano |
| 6,985,185 B1 | | 1/2006 | Crawford et al. |
| 7,061,524 B2 | | 6/2006 | Liu et al. |

(Continued)

OTHER PUBLICATIONS

International Search Report and Written Opinion for Application No. PCT/US2011/048670 mailed Nov. 7, 2011.

(Continued)

*Primary Examiner* — Daniel M Pasiewicz
(74) *Attorney, Agent, or Firm* — Knobbe Martens Olson & Bear, LLP

(57) ABSTRACT

Certain cameras and systems described herein produce enhanced dynamic range still or video images. The images can also have controlled or reduced motion artifacts. Moreover, the cameras and systems in some cases allow the dynamic range and/or motion artifacts to be tuned to achieve a desired cinematic effect.

19 Claims, 11 Drawing Sheets

U.S. PATENT DOCUMENTS

| | | | |
|---|---|---|---|
| 7,106,913 | B2 | 9/2006 | Castorina et al. |
| 7,133,069 | B2 | 11/2006 | Wallach et al. |
| 7,193,652 | B2 | 3/2007 | Hori et al. |
| 7,239,757 | B2 | 7/2007 | Kang et al. |
| 8,068,140 | B2 * | 11/2011 | Helbing ............... 348/208.4 |
| 8,089,530 | B2 * | 1/2012 | Mabuchi ............... 348/229.1 |
| 2005/0057674 | A1 | 3/2005 | Krymski et al. |
| 2006/0109373 | A1 | 5/2006 | Kurane |
| 2008/0094482 | A1 * | 4/2008 | Yoshimura ............ 348/222.1 |
| 2008/0211950 | A1 * | 9/2008 | Ono et al. ................ 348/308 |
| 2009/0153710 | A1 | 6/2009 | John |
| 2010/0002112 | A1 * | 1/2010 | Tay ........................ 348/294 |
| 2010/0165122 | A1 | 7/2010 | Castorina et al. |
| 2010/0187401 | A1 | 7/2010 | Kawahito |
| 2011/0109754 | A1 * | 5/2011 | Matsunaga et al. ..... 348/208.4 |

OTHER PUBLICATIONS

Unger et al, *High Dynamic Range Video for Photometric Measurement of Illumination*. Linköping University, Sweden, the URL of the website on which the document is available indicates that the document may have been available sometime in 2007, http://staffwww.itn.liu.se/~jonun/web/papers/2007-EI/UngerEI07.pdf.

Wang et al, *High Dynamic Range Video Using Split Aperture Camera*. University of Illinois, IL, USA, the Internet Archive: Wayback Machine website indicates that the document was available on-line on Apr. 24, 2009, http://web.archive.org/web/20090424070953/http://vision.ai.uiuc.edu/~wanghc/papers/OMNIVIS05_Hongcheng_3192.pdf.

* cited by examiner

HIGH DYNAMIC RANGE VIDEO

CROSS-REFERENCE TO RELATED APPLICATIONS

This application is a continuation of and claims benefit of priority under 35 U.S.C. §120 to U.S. patent application Ser. No. 13/215,002, filed Aug. 22, 2011, entitled "HIGH-DYNAMIC RANGE VIDEO", and claims benefit of priority from U.S. Provisional Application Nos. 61/376,172, filed Aug. 23, 2010, and 61/473,711, filed Apr. 8, 2011. The disclosures of each of the foregoing applications are incorporated in their entirety by reference herein.

BACKGROUND

The disclosure herein relates to devices for creating improved dynamic range images, such as from images of still or moving scenes detected with a digital camera.

The dynamic range of a digital image can be characterized as the ratio in intensity between the brightest and the darkest measured values in the image. Thus, an image having a wide dynamic range represents more accurately the wide range of intensity levels found in real scenes.

SUMMARY

Conventional digital cameras and techniques typically produce relatively low dynamic range images and provide limited flexibility in controlling dynamic range. Dynamic range can be limited by factors including the level of brightness detectable by each sensor element (e.g., the bit-width of each pixel) and the level of exposure. For example, a captured image may accurately represent the intensity of relatively dark regions of the scene, but not relatively bright regions of the same scene, or vice versa.

Different techniques can be used to enhance the dynamic range of images. However, particularly for moving images, existing techniques are generally overly complex, provide sub-optimal image quality, or allow limited creative flexibility. For example, some techniques produce relatively large, un-controlled motion artifacts (e.g., blurring or flickering). For these and other reasons, certain cameras and systems described herein produce enhanced dynamic range images also having controlled or reduced motion artifacts. Moreover, according to some aspects, the system provides an interface allowing users to tune the dynamic range and/or motion artifacts to achieve a desired cinematic effect.

According to certain aspects, a method is provided of obtaining image data using a digital imaging sensor comprising a picture element array of rows and columns. The method can include using a plurality of picture elements in the picture element array to capture light corresponding to a first image at a first exposure level and using the plurality of picture elements in the picture element array to capture light corresponding to a second image at a second exposure level different than the first exposure level. The method can further include converting the light captured by the plurality of picture elements for the first image to digital measurements and converting the light captured by the plurality of picture elements for the second image to digital measurements. In some embodiments, the step of using the plurality of picture elements in the picture element array to capture light corresponding to the second image at the second exposure level begins prior to the completion of the step of converting the light captured by the plurality of picture elements for the first image to digital measurements. Moreover, in certain embodiments, the step of converting the light captured by the plurality of picture elements for the first image to digital measurements substantially completes prior to the beginning of the step of converting light captured by the plurality of picture elements for the second image to digital measurements.

According to additional aspects, an imaging system is provided, comprising a plurality of picture elements arranged in an array. The imaging system can further comprise control circuitry configured to capture light corresponding to a first image at a first exposure level with the plurality of picture elements in the picture element array and capture light corresponding to a second image at a second exposure level different than the first exposure level with the plurality of picture elements in the picture element array. The control circuitry can further be configured to convert the light captured by the plurality of picture elements for the first image to digital measurements and convert light captured by the plurality of picture elements for the second image to digital measurements. According to some embodiments, the control circuitry begins the capturing of the light corresponding to the second image at the second exposure level prior to the completion of the converting of the light captured for the first image to digital measurements. The control circuitry may additionally substantially complete the converting of the light for the first image to digital measurements prior to the beginning of the converting of the light for the second image to digital measurements.

According to further aspects, a method is provided of processing image data. The method can include receiving first image data corresponding to a plurality of picture elements in a picture element array used to capture light corresponding to a first image at a first exposure level. The method may further include receiving second image data corresponding to the plurality of picture elements in the picture element array used to capture light corresponding to a second image at a second exposure level. The method can additionally include selectively combining the first image data and the second image data to create combined image data corresponding to a combined image having a wider dynamic range than either of the first image or the second image. In some cases, the using the plurality of picture elements in the picture element array to capture light corresponding to the second image at the second exposure level began prior to the completion of converting the light captured by the plurality of picture elements for the first image to digital measurements. Moreover, the converting the light captured by the plurality of picture elements for the first image to digital measurements substantially completed prior to the beginning of the step of converting light captured by the plurality of picture elements for the second image to digital measurements.

In yet further embodiments, a method is provided of obtaining image data using a digital imaging sensor. The method can include capturing a first image with the sensor at a first exposure level and capturing a second image with the sensor at a second exposure level different from the first exposure level. The method may additionally include outputting the first image and outputting the second image. The capturing of the first image in some cases begins before said capturing of the second image begins. Additionally, the capturing of the first image and said capturing of the second image overlap in time in some cases. Further, the outputting of the first image and said outputting of the second image do not overlap in time in some embodiments.

DETAILED DESCRIPTION

Figure 1:
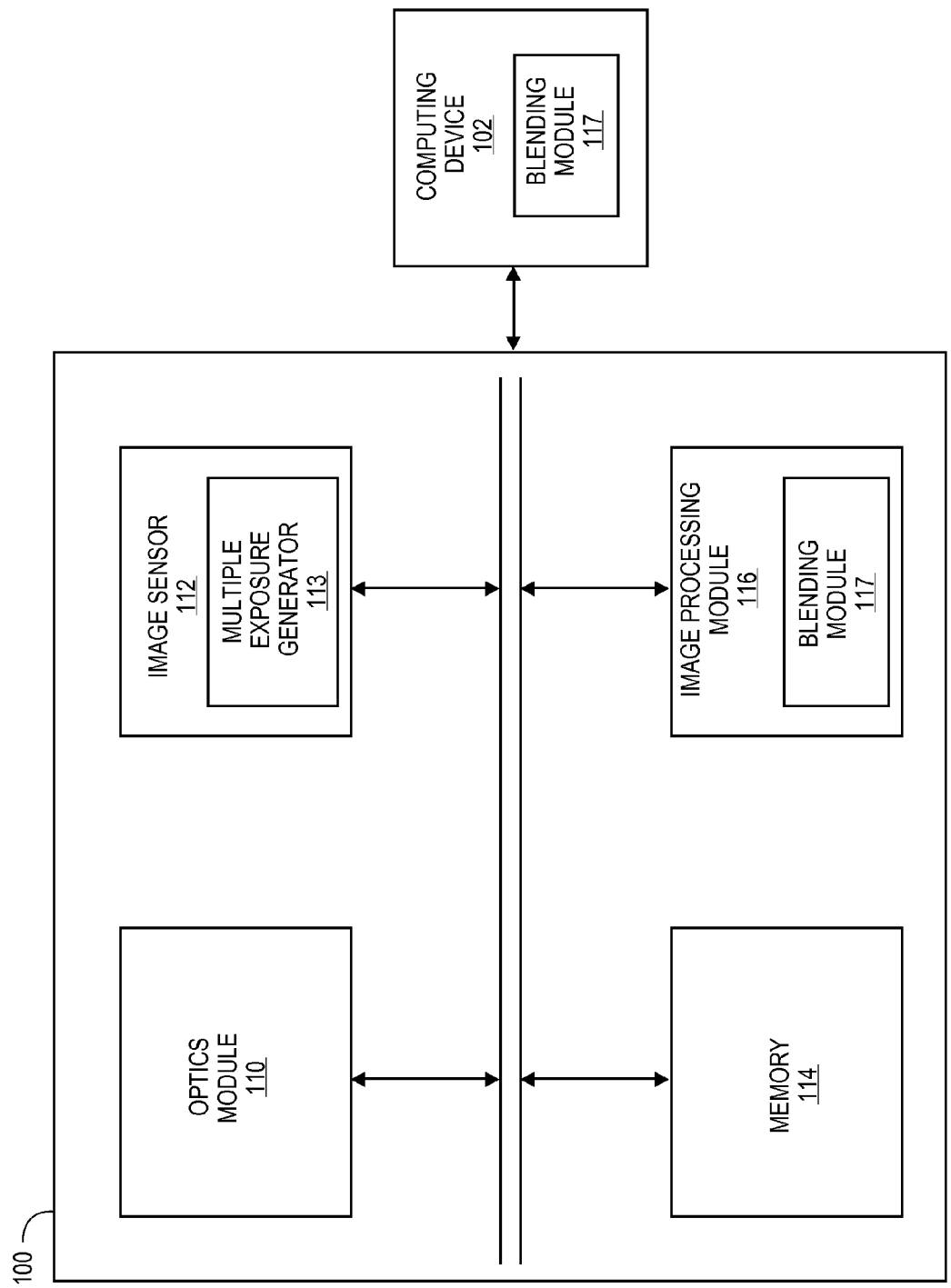
FIG. 1 is a block diagram illustrating an example imaging system according to embodiments described herein.

According to certain aspects, a camera system is provided having a sensor capable of sequentially capturing and outputting first and second image(s) having different exposure levels. Moreover, the system begins capturing the first and second (or more) images within a single frame period, providing controllable or reduced motion artifacts, among other advantages.

For instance, the first and second images are closely timed with respect to one another. Moreover, while there can be some separation in time between when the system captures pixels for the first image and captures corresponding pixels for the second image, the first and second images may nonetheless be referred to as or "conjoined" with one another in time because the separation does not result in visually significant artifacts when the images are combined. To achieve this effect, the exposure times for at least some portions of the first and second images overlap with one another, in some configurations. When recording video images, some sensors disclosed herein output at least first and second closely-timed (or "conjoined") image streams (also referred to herein as "tracks"). According to additional aspects, systems and methods described herein process the first and second image streams (e.g., in-camera or during post-processing) to create a combined output stream.

For example, for each video frame, the imaging system captures individual exposures in a second (e.g., relatively high exposure) track very soon after the capturing corresponding exposures in the first (e.g., relatively low exposure) track. In this manner, certain techniques described herein reduce or remove the potential for visual separation between objects in an image track having a first exposure level as compared to the same objects in an image track(s) having a different exposure level. Undesirable levels of visual separation between objects could otherwise arise between the objects in the first image and corresponding objects in the second image, due either to movement of objects in scene or of the camera, for example.

Moreover, the system acquires the individual images from the sensor relatively quickly. Where the system incorporates a rolling shutter, for example, the period of delay from between beginning exposure for the first rows of the sensor for a particular image and beginning the exposure for the last rows of the sensor for the image is relatively short. Similarly, the period of delay from between reading out the first rows for an image to reading out the last rows of the sensor for the image is also relatively short. In this manner, the system limits the amount of motion artifact (e.g., wobble, skew, smear) introduced by the rolling shutter. This is in contrast to configurations where the amount of time it takes to capture and read out an entire exposure consumes a larger period of time.

Moreover, systems described herein according to some aspects exploit the minimal gap between first and second images, limited rolling shutter artifacts, and other aspects of the techniques described herein to achieve a variety of desirable creative effects. For example, the system can selectively blend or combine the closely-timed image streams to adjust the dynamic range, the character of the motion effect (e.g., amount or quality of blur), or other characteristic.

In some cases, the blending of the image streams is tailored to achieve a motion effect substantially similar to how motion is perceived by the human eye. In some instances, the blending is adjusted such that the blurring effect is similar to that of a traditional camera. A user may advantageously control the amount or quality of the image stream blending, providing additionally creative power and flexibility. Such processes can be partially or fully automated, as well.

Thus, the techniques described herein provide a variety of benefits. Particularly in the area of recording motion video, certain embodiments provide recordings having improved-dynamic range, customized motion or other visual effects, and combinations thereof.

While the techniques described herein are discussed primarily with respect to digital motion cameras recording continuous video, it will be understood that various aspects of the inventions described herein are compatible with still cameras, as well as digital still and motion cameras (DSMC's).

System Overview

FIG. 1 is a block diagram an example system 100 that detects optical data and processes the detected data. The system 100 can include an imaging device 101 that can include an optics module 110, and an image sensor 112, which may further include a multiple exposure generator 113. The device 101 can also include a memory 114 and an image processing module 116. The image processing module 116 may in turn include a blending module 117 that is generally configured to adjust the dynamic range of an output image or stream of images. The blending module 117 may further be configured to adjust the motion effect in the output stream.

The imaging device 101 may be a camera system, for example, and the optics module 110, image sensor 112, memory 114, and the image processing module 116 or portions thereof may be housed in or supported by the camera housing. Moreover, portions of the system 100 may be included in a separate device. For example, as shown, the blending module 117 or portions thereof in some configurations resides in a separate computing device 102, such as a laptop or other computer.

The optics module 110 focuses an image on the image sensor 112. Sensors 112 may include, for example, an array of charge-coupled devices (CCD) or Complementary Metal-Oxide-Semiconductor (CMOS) image sensor cells such as active-pixel sensor cells. Such image sensors are typically built on silicon chips and may contain millions of image sensor cells. Each sensor cell detects light reaching its surface and outputs a signal that corresponds to the intensity of the light detected. The detected light is then digitized.

Because these image sensors are sensitive to a broad spectrum of wavelengths of light, a color filter array can be disposed over the light sensitive surface of such sensors. One type of color filter array is a Bayer pattern color filter array, which selectively passes red, blue, or green wavelengths to sensor elements. The output of such a sensor, however, is a mosaic image. This mosaic image is formed by the overlapping matrices of red, green, and blue pixels. The mosaic image is usually then demosaiced, so that each picture element has a full set of color image data. The color image data may be expressed in the RGB color format or any other color format.

Some of the embodiments disclosed herein are described in the context of a video camera having a single sensor device with a Bayer pattern filter. However, the embodiments and inventions herein can also be applied to cameras having other types of image sensors (e.g., CMY Bayer as well as other non-Bayer patterns), other numbers of image sensors, operating on different image format types, and being configured for still and/or moving pictures. It is to be understood that the embodiments disclosed herein are exemplary but non-limiting embodiments, and the inventions disclosed herein are not limited to the disclosed exemplary embodiments.

The optics hardware 110 can be in the form of a lens system having at least one lens configured to focus an incoming image onto the image sensor 112. The optics hardware 110, optionally, can be in the form of a multi-lens system providing variable zoom, aperture, and focus. Additionally, the optics hardware 110 can be in the form of a lens socket supported by a camera housing and configured to receive a plurality of different types of lens systems for example, but without limitation, the optics hardware 110 include a socket configured to receive various sizes of lens systems including a 50-100 millimeter (T3) zoom lens, a 50-150 millimeter (T3) zoom lens, an 18-50 millimeter (T3) zoom lens, an 18-85 millimeter (T2.9) zoom lens, a 300 millimeter (T2.8) lens, 18 millimeter (T2.9) lens, 25 millimeter (T1.8) lens, 35 millimeter (T1.8) lens, 50 millimeter (T1.8) lens, 85 millimeter (T1.8) lens, 85 millimeter (T1.8) lens, 100 millimeter (T1.8) and/or any other lens or any other lens. In certain embodiments, a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, and/or any other lens. As noted above, the optics hardware 110 can be configured such that despite which lens is attached thereto, images can be focused upon a light-sensitive surface of the image sensor 112.

The image sensor 112 can be any type of image sensing device, including, for example, but without limitation, CCD, CMOS, vertically-stacked CMOS devices such as the Foveon® sensor, or a multi-sensor array using a prism to divide light between the sensors. In some embodiments, the image sensor 112 can include a CMOS device having about 12 million photocells. However, other size sensors can also be used. In some configurations, camera 10 can be configured to output video at "5 k" (e.g., 5120×2700), Quad HD (e.g., 3840×2160 pixels), "4.5 k" resolution (e.g., 4,520×2540), "4 k" (e.g., 4,096×2,540 pixels), "2 k" (e.g., 2048×1152 pixels) or other resolutions. As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels.

The camera can also be configured to downsample and subsequently process the output of the sensor 112 to yield video output at 2K, 1080 p, 720 p, or any other resolution. For example, the image data from the sensor 112 can be "windowed", thereby reducing the size of the output image and allowing for higher readout speeds. However, other size sensors can also be used. Additionally, the camera can be configured to upsample the output of the sensor 112 to yield video output at higher resolutions. Moreover, the camera can be configured to capture and record video at 10, 20, 24, 30, 60, and 120 frames per second, or any other frame rate. Additionally, the blending techniques described herein are generally compatible with a variety resolutions and frame rates, including those listed above.

The memory 114 can be in the form of any type of digital storage, such as, for example, but without limitation, hard drives, solid-state drives, flash memory, optical discs, or any other type of memory device. In some embodiments, the size of the memory 114 can be sufficiently large to store image data from the compression module corresponding to at least about 30 minutes of video at 12 mega pixel resolution, 12-bit color resolution, and at 60 frames per second. However, the memory 114 can have any size.

In some embodiments, the memory 114 can be mounted on an exterior of a camera housing. Further, in some embodiments, the memory can be connected to the other components through standard or custom communication ports, including, for example, but without limitation, Ethernet, USB, USB2, USB3, IEEE 1394 (including but not limited to FireWire 400, FireWire 800, FireWire S3200, FireWire S800T, i.LINK, DV), SATA and SCSI. Further, in some embodiments, the memory 114 can comprise a plurality of hard drives, such as those operating under a RAID protocol. However, any type of storage device can be used.

The image processing module 116 may, for example, operate on data that is stored in the memory 114. Alternatively, the image processing module may operate on data as it comes from the image sensor 112, and the processed data may then be stored in the memory 114. The image processing module 116 may perform a variety of operations on the data. Depending on the operation, the processing module 116 may perform the operation on the individual first and second image streams, prior to blending, or alternatively, on the blended HDR output stream.

For example, the image processing module 116 may compress the data from the image sensor, perform pre-compression data-preparation (e.g., pre-emphasis and/or entropy reduction), format the compressed data, and the like. Examples of such techniques are described in greater detail in U.S. Pat. No. 7,830,967 entitled "VIDEO CAMERA" (the '967 patent), which is incorporated by reference herein in its entirety. In some instances, the image processing module 116 processes the individual image stream (or combined image stream) to tune the image streams to perceptual space, as will be described in detail below with respect to FIG. 8A. Additional compatible techniques include green data modification and pre-emphasis processes shown and described throughout the '967 patent (e.g., with respect to FIGS. 8-11 and columns 11-13). In general, certain embodiments described herein are compatible with and/or are components of embodiments described in the '967 patent. Thus, some or all of the features described herein can be used or otherwise combined with various features described in the '967 patent, including features described in the '967 patent which are not explicitly discussed herein.

The sensor 112 can be configured to sequentially capture and output at least first and second image streams (or tracks) having different exposure levels. For example, the multiple exposure generator 113 may comprise specially designed timing control logic that controls the sensor 112 to output the image streams. In some cases, the sensor 112 can output more than two tracks (e.g., totaling 3, 4, 5, 10 or more) having various exposure levels.

Where there is a significant amount of delay between exposures or portions of exposures in a first track and corresponding exposures or portions of exposures in a second track, undesirable motion artifacts can arise. For example, such artifacts can arise where an object in the recorded scene (e.g., an actor or other photographic subject) moves a visually significant distance between the time the first image stream frame is captured and the time the second image stream frame is captured. In such cases, visual separation, or "gaps," can arise between objects in one track as compared to the same object in another track. Such issues can be difficult to correct for or control in post-processing.

For these and other reasons, the sensor 112 according to certain aspects is configured to sequentially output at least first and second image streams having different exposure levels and which are closely timed with respect to one another. For example, the multiple exposure generator 113 may control a pixel array and output circuitry of the sensor 112 to cause the sensor 112 to output first and second image streams. Each image stream can have multiple frames which are closely-timed and/or at least partially overlapping in time with corresponding frames from the other image stream. For instance, the amount of time from between when the system converts captured data for picture elements in the images from the first stream to digital values and begins to expose the same picture elements for corresponding images in the second image stream is relatively short. Moreover, in some cases, the multiple exposure generator 113 captures at least some of the picture elements for the images in the second stream while capturing other picture elements for the corresponding images in the first stream, during overlapping time periods. In this manner, the visual separation between moving objects in the first image stream and the same moving objects in the second image stream may be relatively insignificant, or may be otherwise substantially reduced. The multiple exposure generator 113 may generally be a specialized timing generator coupled to the sensor 112, and is described in greater detail with respect to FIG. 2.

Because there may be no significant visual separation between objects in a frame in the first image track frame and the corresponding objects in a subsequently captured frame in the second image track, the first and second image tracks may also be referred to as having no "gaps" with respect to one another, or as substantially "touching" one another. For example, while there may be some minor delay between the capture of picture elements for first images and the capture of picture elements in the second images, the delay may be so small that there is reduced or substantially no visual object separation at full sensor resolution, at one or more scaled-down resolutions, or a combination thereof. Due to the closely-timed nature of the tracks, the motion artifacts in the combined output track are substantially reduced, removed, or can be controlled in a desired fashion.

Sensors described herein are referred to herein as having "adjacent read" or "conjoined exposure" capability. Additionally, the images tracks may be referred to as being "adjacent," "closely timed," "conjoined," or the like.

Moreover, as described above, the individual exposures according to some embodiments are captured and/or output in a compact manner, making efficient use of the frame period.

The blending module 117 according to certain embodiments selectively combines the closely-timed tracks to produce an output track having a desired visual effect. For instance, the output video stream can have an enhanced dynamic range relative to the dynamic range of the individual first and second image tracks. As an example, the first image stream may have a relatively low exposure level (e.g., short integration time), providing useful data in relatively bright regions of a captured scene, such as highlight detail. The second image stream may have a relatively higher exposure level (e.g., longer integration time), providing useful data in relatively darker regions of the scene, such as detail in the shadows.

Moreover, in some cases where the sensor 112 outputs more than two tracks, the blending module 117 is capable of combining a corresponding number of tracks. Where the blending module 117 or portions thereof reside in the external computing device 102, the dynamic range and/or motion processing can be done in post-processing. Additionally, depending on the implementation, the blending module 117 may operate on data stored in the memory 114, on data as it is output from the image sensor 112, or on data stored in the external computing device 102.

As discussed, the combined output stream may be created on camera or alternatively off camera, during post-processing. In one configuration, the user can select on-camera or off camera creation of the output stream, as desired. Moreover, as will be described in further detail below with respect to FIGS. 5-9, in various embodiments the blending module 117 can combine the closely-timed tracks according to a variety of algorithms. The algorithms can be fixed or user-selectable or adjustable. For example, in one embodiment, the image streams are combined on-camera according to a fixed algorithm. In another configuration, the user selects from a variety of algorithms, depending on the desired creative effect.

Generating Tracks of Closely-Timed Images Having Multiple Exposure Levels

Figure 2:
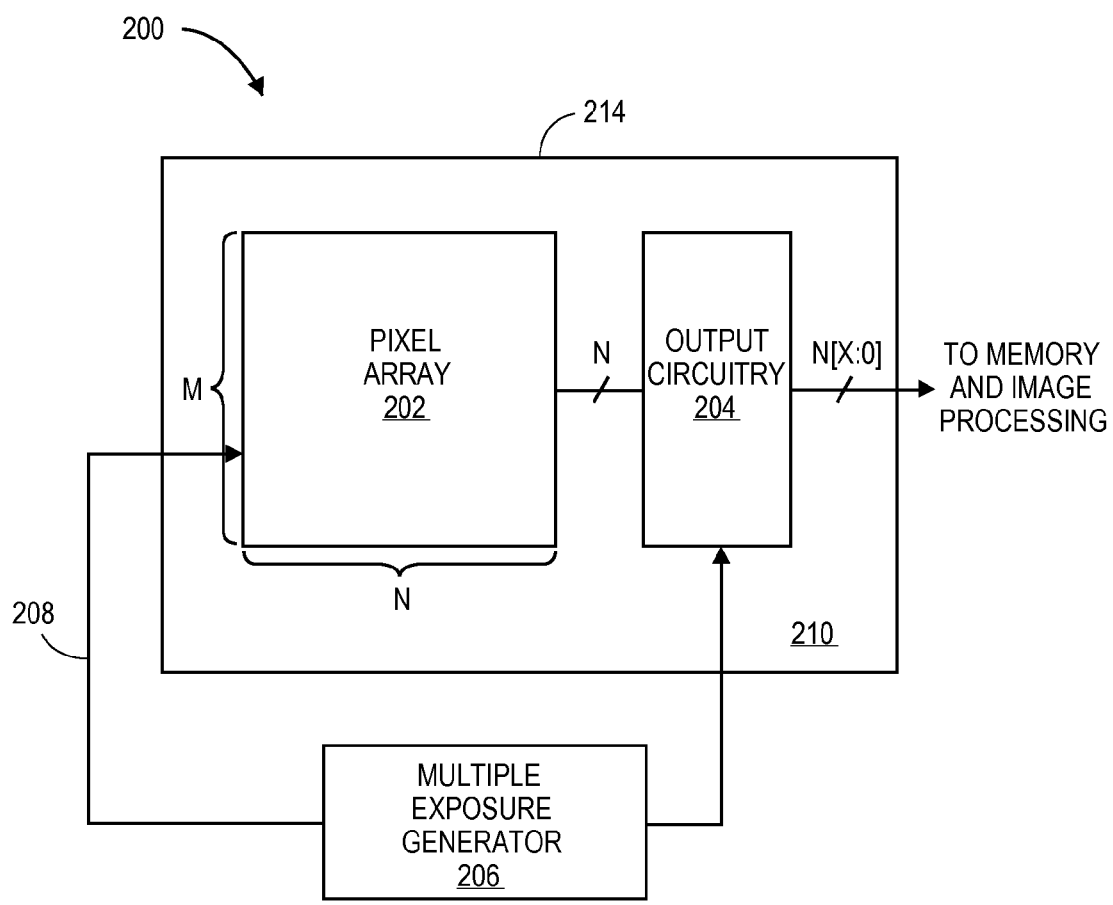
FIG. 2 is a block diagram illustrating an example sensor architecture capable of generating multiple, closely-timed exposures according to some embodiments.

FIG. 2 is a block diagram illustrating example image sensor 200 capable of generating closely-timed exposures according to embodiments described herein. Referring to FIG. 2, the image sensor 200 includes a pixel array 202, output circuitry 204, and a multiple exposure generator 206. As will be described in greater detail, the multiple exposure generator 206 generally controls the various components of the sensor 200 to provide closely-timed exposures on the output bus 212 of the sensor 200 for further storage and processing.

The image sensor 200 may be similar to the image sensor 12 described above with respect to FIG. 1, for example, and the pixel array 202 includes a plurality of pixels (e.g., photocells) arranged in a matrix including "M" rows and "N" columns. While a wide variety of values are possible for "M" and "N", an example "5 k" sensor includes 5,120 rows and 2,700 columns, an example Quad HD sensor includes 3,840 and 2,160 pixels, an example "4.5 k" resolution sensor includes 4,520 rows and 2,540 columns, an example "4 k" sensor includes 4,096 rows and 2,540 columns, and an example "2 k" sensor includes 2,048 and 1,152 columns.

In the illustrated example, sensor 200 is configured to output a single row at a given time, and the sensor 200 includes one instance of output circuitry 204 that is configured to process and output image information for a single row. In another embodiment, such as where a Bayer pattern sensor is used, the sensor outputs two rows at a time and can include two instances of the output circuitry 204. In yet other configurations, the sensor 200 outputs other numbers of rows during a given time slot (e.g., 2, 3, 4, 5, 10 or more rows), and can include a corresponding number of instances of the output circuitry 204.

During operation, the multiple exposure generator 206 provides row select information via input bus 208 to row decode logic (not shown) of the pixel array 202. For each of the selected rows, the pixel array 202 provides the stored values for the N pixels corresponding to the columns of the selected row (or subset of rows) to the output circuitry 204.

The output circuitry 204 of the example sensor 200 also receives timing control signals on the bus 210 from the multiple exposure generator 206, and is generally configured to process and digitize the analog pixel values received from the pixel array. The output circuitry 204 of the example sensor 200 includes sets of programmable-gain amplifiers (PGAs) and analog-to-digital converters (ADCs), although a variety components may be used in various implementations. The output circuitry 204 in turn presents the digitized, processed values of the currently selected row on the output bus 212. For example, the sensor 200 may transmit the values to the memory 114, image processing module 116, or other components of the system of FIG. 1 for storage and processing. In some instances, the sensor buffers the values for one or more rows before transmission on the output bus 212.

As shown in FIG. 2, the multiple exposure generator 206 may reside outside of the packaging 214. For example, the packaging 214 is an integrated circuit packaging and the pixel array 202 and output circuitry 204 are formed on an integrated circuit housed in the packaging 214. The multiple exposure generator 206, on the other hand, may form a part of a separate integrated circuit that is housed in a separate package. In another embodiment, the multiple exposure generator 206 is included on the same integrated circuit as the other components, and is housed in the sensor package 214.

In some cases, the multiple exposure generator 206 comprises logic implemented in a field-programmable gate array (FPGA), although the multiple exposure generator 206 can be implemented in a variety of ways, and can include hardware, software, analog and/or digital circuitry, such as custom circuitry, a microprocessor, an application-specific integrated circuit (ASIC), combinations thereof and the like.

Figure 3A:
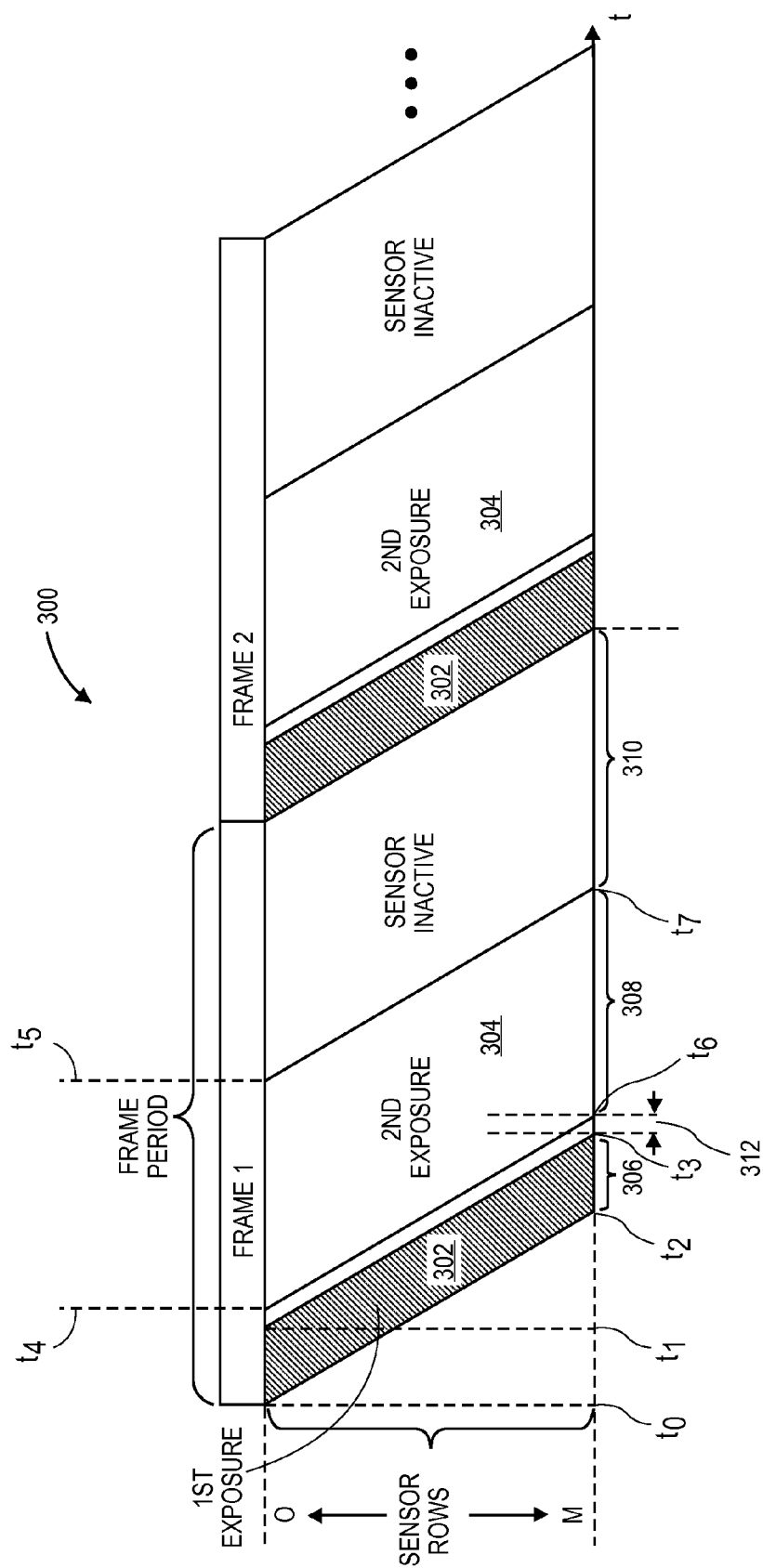
FIGS. 3A-3D are timing diagrams showing operation of example sensors recording multiple, closely-timed exposures for multiple frames of recorded video in accordance with certain embodiments.

FIG. 3A is an example timing diagram 300 illustrating two consecutive frames of video for a camera that is recording two closely-timed image tracks (also referred to as image streams) in accordance with an embodiment. Two closely-timed exposures 302, 304 are taken within each video frame, one for each image track. Thus, a first image track corresponds to the first exposures 302 taken over a series of recorded video frames and a second image track 304 corresponds to second exposures 304 taken over the same series of video frames.

The camera exposes the first exposure 302 for each frame for a first integration period 306, and exposes the second exposure 304 for each frame for a second integration period 308. The timing diagram 300 may be representative of the operation of the sensors 112, 200 of FIGS. 1 and 2, for example. Moreover, while the diagram shows operation for only two frames for the purposes of illustration, it will be appreciated that the camera may record any number of frames, depending on the length of the recording.

As shown, the camera of the illustrated example exposes the rows 0→M of the sensor in an overlapping fashion. In this manner, the first row (or subset of rows) is exposed for a first integration period beginning at time $t_0$ and ending at time $t_1$. The remaining rows (or subsets of rows) are exposed in successive, overlapping time slots, and the first integration period for the last row extends from time $t_2$ to time $t_3$. This general exposure scheme, where successive rows (or subsets of rows) are exposed in successive, overlapping time slots, may generally be referred to as a "rolling shutter" technique.

Picture elements for the second exposure 304 are advantageously captured relatively shortly after capturing the same picture elements for the first exposure 302. For example, the inter-exposure delay 312 between the end of the first exposure period 306 for each row (or subset of rows) and the beginning of the second exposure period 308 for the same row is relatively minimal. For example, as discussed in greater detail with respect to FIG. 4A below, the inter-exposure delay 312 may depend in one instance on the reset time for one or more rows of the sensor. In other cases, the inter-exposure delay 312 can depend on some other parameter(s). Referring again to the sensor 200 of FIG. 2, the multiple exposure generator 206 is configured to generate control signals for operating the pixel array 202 and output circuitry 204 to generate the closely-timed exposures 302, 304.

Moreover, the inter-row skew for the individual exposures 302, 304 introduced by the rolling shutter is relatively minimal. This results in a shorter overall image acquisition time, and helps to control any motion artifacts that may otherwise be introduced by the rolling shutter. As will be discussed further with respect to FIG. 4A, the inter-row skew and image acquisition time can be related to the readout time for a row (or subset rows).

As shown, the system additionally makes efficient use of the sensor hardware and frame period by overlapping certain portions of the first and second exposures in time. For instance, the system begins to expose at least some of the rows (or subsets of rows) for the second exposure 304 before all of the rows have been converted and/or read out for the first exposure 302. Moreover, at least some rows are exposed for the first exposure 302 concurrently with other rows for the second exposure 304.

The system in certain embodiments additionally substantially completes the conversion and/or readout of the sensor rows (or subsets of rows) for the first exposure 302 before beginning to convert and/or readout the rows for the second exposure 304. By dedicating the conversion and readout circuitry to each of the respective exposures until they are complete, the system helps maintain a compact overall acquisition time for the individual exposures 302, 304. In the illustrated embodiment, the system completes converting and/or reading out 100 percent of the sensor rows for first exposure 302 before beginning to convert and/or readout any of the rows for the second exposure 304. In other cases, the system completes converting and/or reading out at least 80 percent, at least 90 percent, at least 95 percent, at least 96 percent, at least 97 percent, at least 98 percent or at least 99 percent of the sensor rows for the first exposure 302 before beginning to convert and/or read out the rows for the second exposure 304. In yet further cases, the system substantially completes conversion and/or readout of the rows for the first exposure 302 before reading out any of the rows for the second exposure 304, or before reading out more than 1 percent, more than 2 percent, more than 3 percent, more than 4 percent, more than 5 percent, more than 10 percent, or more than 20 percent of the rows for the second exposure 304, depending on the embodiment. Further details regarding the specifics of the sensor timing are provided below with respect to FIGS. 4A-4C.

Depending on the particular configuration, the duration of the various time periods shown in FIG. 3A can vary greatly, including the frame period 312, first and second exposure integration times 302, 304, inter-exposure delay 312 and sensor inactive 310. The sensor inactive time 310 may refer to a period where sensor elements are substantially inactive and not being exposed. For example, when capturing the first and second exposures, the sensor electronically activates the appropriate picture elements according to the rolling shutter technique to be sensitive to and capture incident light. In contrast, the appropriate pixel elements are electronically deactivated and therefore not sensitive to incident light during the sensor inactive period 310. In other implementations, where a physical shutter is used, the physical shutter is opened/closed in place of the electronic activation/deactivation. The sensor inactive period can also instead be defined as the period of time from between $t_7$, when exposure completes for the last row in the second exposure 304, to the end of the frame period, immediately before the first row in the first exposure 302 begins to expose for the next frame.

Figure 3B:
Figure 3C:
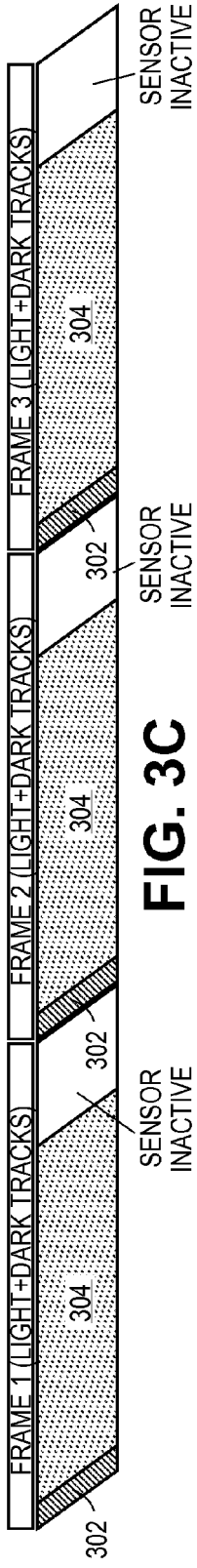
Figure 3D:

FIGS. 3B-3D illustrate timing diagrams for several example configurations. For clarity, the inter-exposure delay 312 is not shown in FIGS. 3B-3D. In one embodiment, FIG. 3B illustrates a scenario where the frame period is about 41.7 milliseconds (24 fps), the first integration time 306 is about 2.6 milliseconds, the second integration time 308 is about 20.8 milliseconds, the inter-exposure delay 312 is about 15.6 microseconds, and the shutter closed time is about 18.2 milliseconds. The second integration time 308 is about half the frame period, and thus generally corresponds to an integration time for a sensor implementing a 180 degree shutter. In another example case, FIG. 3C shows a scenario where the frame period 312 is about 41.7 milliseconds (24 fps), the first integration time 306 is about 2.6 milliseconds, the second integration time 308 is about 31.6 milliseconds, the inter-exposure delay 312 is about 15.6 microseconds, and the shutter closed time 310 is about 7.4 milliseconds. In this case, the second integration 308 time corresponds to an integration time for a sensor implementing a 273 degree shutter. In yet another instance, FIG. 3D illustrates an case where the frame period 312 is about 41.7 milliseconds (24 fps), the first integration time 306 is about 0.65 milliseconds, the second integration time 308 is about 5.2 milliseconds, the inter-exposure delay 312 is about 15.6 microseconds, and the shutter closed time 310 is about 35.75 milliseconds. Here, the second integration time 308 corresponds to an integration time for a 45 degree shutter.

Figure 3E:
FIG. 3E is a timing diagram showing operation of a sensor operating without recording closely-timed exposures.

For comparison, FIG. 3E illustrates a timing diagram for another example camera capturing multiple exposures having different exposure levels. However, unlike the embodiments shown in FIGS. 3A-3D, the camera of FIG. 3E captures the long exposures 304 and short exposures 306 on different, alternating frames. Thus, the exposures 304 and 306 are not closely-timed, and significant undesirable motion artifacts may be present. For example, relatively large gaps of visual separation may exist between image scene objects in the long exposures 304 as compared to image scene objects in the short exposure 306 in the next frame. Thus, it can be difficult in such cases to combine the short and long exposures 304, 306 to create high-dynamic range images with controlled motion artifacts.

Figure 4A:
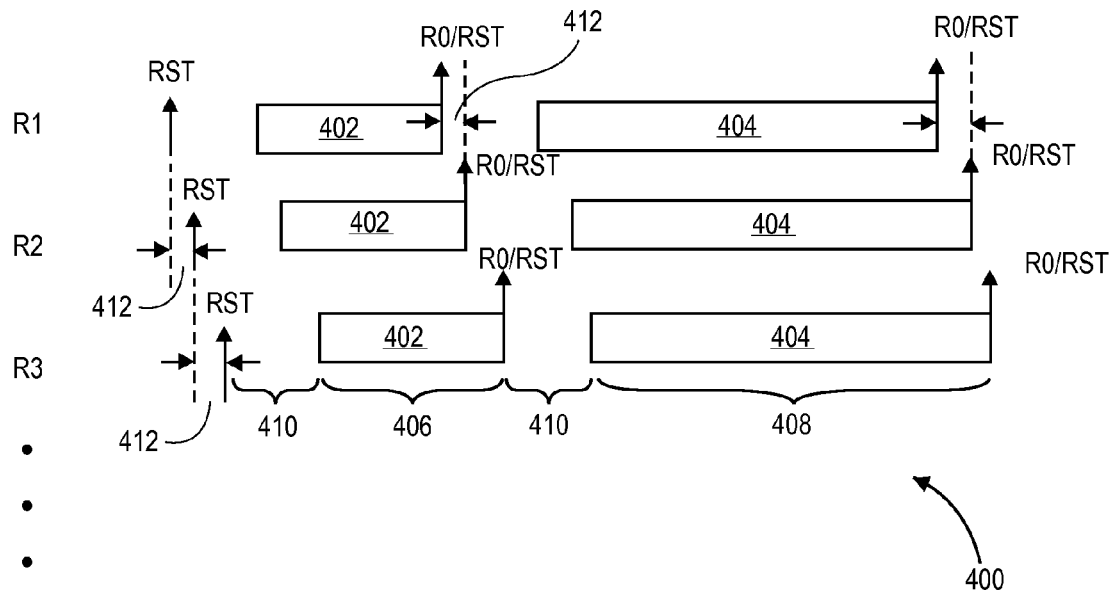
FIGS. 4A-4C are timing diagrams showing operation of embodiments of sensors recording closely-timed exposures for several rows of an image sensor.

FIG. 4A shows a timing diagram 400 illustrating closely-timed first and second exposures 402, 404 for one frame of recorded video. For clarity, the timing diagram is shown for only the first three rows R1, R2, R3 (or subsets of rows) of an image sensor. For example, the diagram 400 may correspond to one embodiment of a more detailed depiction of the exposure timing for the first three rows of the sensor whose operation is depicted in any of FIGS. 3A-3D. Referring to the first row R1, before the first exposure 402 begins, the row R1 is initially reset, as indicated by the vertical arrow labeled "RST."

After a reset period 410 passes corresponding to the amount of time it takes to reset the pixels in the row R1, the photocells in the row R1 begin to accumulate charge during the first integration period 406. Following the first integration period 406, the pixels in the first row R1 have accumulated charge corresponding to the first exposure level. A readout cycle is then initiated for the row R1, along with another reset cycle, as indicated by the vertical arrow labeled "RO/RST". Referring to FIG. 2, at the end of the readout period 412, the row R1 is readout of the pixel array 202 by the output circuitry 204, and is provided on the output 212 for storage and/or processing.

Additionally, once the row R1 has completed the second reset cycle, the second exposure 404 begins. As such, the inter-exposure delay 410 between the first and second exposures in one embodiment depends on the reset time 410 for a row of pixels (or subset of rows where more than one row are read out at once). For example, the inter-exposure delay 410 may correspond to, substantially correspond, or be approximately equal to the reset time 410 for one row (or subset of rows). In other instances, the inter-exposure delay 410 is less than or equal to approximately one, approximately 2, approximately 5, approximately 10, approximately 20, approximately 50 or approximately 100 reset times 410 for a row (or subset of rows). In yet further cases, the inter-exposure delay 410 is some value between approximately one reset time 410 for a row (or subset of rows) and approximately 2, approximately 5, approximately 10, approximately 20, approximately 50 or approximately 100 reset times, depending on the embodiment. As is described in greater detail below, the reset time 410 can advantageously be relatively short, leading to closely timed first and second exposures 402, 404.

In other configurations, the delay between the first and second exposures 402, 404 can correspond to a variety of values other than the reset time 410. For example, the inter-exposure delay 410 may correspond to, substantially correspond to, or otherwise depend on the readout time 412, such as where the readout time is greater than or equal to the reset time. In one such embodiment, the inter-exposure delay 410 is approximately equal to the readout time 412. In other cases, depending on the specific implementation, the inter-exposure delay 410 is less than or equal to approximately one, approximately 2, approximately 5, approximately 10, approximately 20, approximately 50 or approximately 100 readout times 412 for a row (or subset of rows). According to yet further embodiments, the inter-exposure delay 410 is be some value between approximately one readout time 412 for a row (or subset of rows) and approximately 2, approximately 5, approximately 10, approximately 20, approximately 50 or approximately 100 readout times 412. In further cases, the delay 410 between the first and second exposures 402, 404 depends on both the readout time and the reset time. For example, the reset operation in one embodiment is initiated only after completion of the readout operation. In this case, the delay between the first and second exposures 402, 404 may correspond to or substantially correspond to the sum of the readout time 412 and the reset time. In such cases, the inter-exposure delay 410 may be less than or equal to approximately the sum of the reset time 410 and the readout time 412 for a row (or subset of rows), or may alternatively be less than or equal to approximately the sum of the reset time 410 and the readout time 412, multiplied by a factor of 2, 5, 10, 20, 50 or 100. In further embodiments, the inter-exposure delay 410 can be some value between approximately the sum of the reset time 410 and the readout time 412 for a row (or subset of rows) and approximately the sum of the reset time 410 and the readout time 412, multiplied by a factor of 2, 5, 10, 20, 50 or 100.

As shown, the sensor initiates a similar sequence of operations for the other rows R2, R3 ... RM. However, as described above, with respect to FIG. 2, the sensor may be configured to output only one row (or a subset of two or more rows) at a time. Thus, for each subsequent row, the multiple exposure generator 206 waits at least one readout period 412 before initiating the initial reset cycle. As such, the exposure timing for each row is staggered in time with respect to the other rows. In the illustrated example, each subsequent row is delayed by the readout period 412 with respect to the preceding row. As such, when an integration period 402, 404 is complete for a particular row, the output circuitry 204 will be generally immediately available. In this manner, the utilization of the readout circuitry (e.g., the output circuitry 204 of FIG. 2) is relatively high. Referring again to FIG. 2, the multiple exposure generator 206 may send the appropriate control signals to the pixel array via the bus 208 and to the output circuitry 204 via the bus 210, initiating the reset and readout of the rows R1, R2, R3 . . . RM in the manner described.

Although a variety of values are possible, one example sensor 200 has 2740 rows of pixels configured to be readout two rows at a time, and the readout time 412 for the two rows of the example sensor 200 is about 7.4 microseconds. In this example, the reset time 410 for resetting a subset of two rows is about 15.6 microseconds. Thus, the time between the first and second exposures 402, 404 and the time between the closely-timed image streams is about 15.6 microseconds, or about 0.03 percent of the frame period for a frame rate of 24 fps, and about 0.05, 0.08, 0.09, and 0.16 percent of the frame period for frame rates of 30, 50, 59.94, and 100 fps, respectively. In another configuration, for example, the sensor 200 produces first and second image streams which are temporally spaced by no more than about 7 microseconds. As such, for each frame the sensor 200 captures the a subsequent 404 (corresponding to the second image stream) no more than about 7 microseconds after capturing the preceding exposure 402 for that frame (corresponding to the first image stream). In other embodiments, the first and second exposures 402, 404 and corresponding image streams are temporally spaced by no more than about 4 microseconds, no more than about 2 microseconds, or no more than about 1 microsecond. In yet other embodiments, the first and second exposures 402, 404 are spaced by no more than about 1 millisecond, no more than about 100 microseconds, no more than about 50 microseconds, no more than about 25 microseconds, no more than about 20 microseconds, no more than about 16 microseconds, no more than 15.6 microseconds, no more than about 15 microseconds, or no more than about 10 microseconds. As indicated above, in some embodiments there are more than two exposures within each frame. In such cases, the delay between any two adjacent exposures may correspond to any of the above listed values or ranges of values. In various embodiments, the inter-exposure delay is less than about 0.01, 0.02, 0.03, 0.04, 0.05, 0.1, 0.2, 0.5, 1, 2, 5, 10, 20, or 30 percent of the frame period.

Additionally, as mentioned previously, because acquisition of each row (or subset of rows) is staggered in time from the immediately preceding row by a relatively minimal amount, the skew and resulting motion artifacts introduced by the rolling shutter are reduced. For example, the inter-row acquisition skew between the time the system begins to acquire image data for a row (or subset of rows) and begins to acquire image data for the immediately subsequent row corresponds to the readout time 412 for a row (or subset of rows) in the illustrated embodiment. Likewise, an inter-row readout skew between the time the system completes reading out acquired image data for a row (or subset of rows) and completes reading out acquired image data for the subsequent row (or subset of rows) corresponds to the readout time 412 for a row (or subset of rows). In various embodiments, the inter-row acquisition skew and/or the inter-row readout skew is approximately equal to one readout time 412 for a row or subset of rows, or is less than or equal to approximately one, approximately 1.5, approximately 2, approximately 2.5, or approximately 3 readout times 412.

Extending the inter-row skew across all of the rows for FIG. 4A, the total intra-exposure acquisition skew across the entire image from between the time the system begins to acquire a first of the rows (or subset of rows) and begins to acquire all of the rows or substantially all (e.g., at least 90, 95 or 99 percent) of the rows is given by approximately:

$$(M-1)*\text{read\_out\_time}, \qquad \text{(Eq. 1)}$$

Similarly, the intra-exposure readout skew between the time the system completes reading out a first of the rows and completes reading out substantially all of the rows may correspond to the same amount. As a specific example, for the 2740 row sensor described above, the intra-exposure acquisition and readout skews are both equal to about 10.1 milliseconds ($(2740/2-1)*7.4$ microseconds).

Further, the acquisition time for an entire exposure, from between the time when the system begins to acquire a first of the rows (or subsets of rows) and completes reading out substantially all of the rows for the exposure is approximately given by:

$$\text{exposure\_time}+[(M-1)*\text{read\_out\_time}]. \qquad \text{(Eq. 2)}$$

In further compatible embodiments, the image acquisition time is less than or equal to one of the following:

$$\text{exposure\_time}+[(M-1)*\text{read\_out\_time}] \qquad \text{(Eq. 3)}$$

$$\text{exposure\_time}+[(M-1)*1.5*\text{read\_out\_time}], \qquad \text{(Eq. 4)}$$

$$\text{exposure\_time}+[(M-1)*2*\text{read\_out\_time}], \qquad \text{(Eq. 5)}$$

$$\text{exposure\_time}+[(M-1)*2.5*\text{read\_out\_time}], \text{ or} \qquad \text{(Eq. 6)}$$

$$\text{exposure\_time}+[(M-1)*3*\text{read\_out\_time}]. \qquad \text{(Eq. 7)}$$

The systems in each of the above-described specific examples record a first relatively lower exposure (e.g., short exposure) followed by a second relatively higher exposure (e.g., long exposure) for each frame. However, the number and order of the inter-frame exposures can vary, and can be customized as desired. For example, in one instance, each frame includes a long track followed by a short track. Additionally, the device can be configured to capture more than two exposures per frame, such as 3, 4, 5, 10 or more exposures. As just a few illustrative examples, the following capture patterns are possible including more than two exposures per frame: (1) long, short, long; (2) short, long, short; (3) short, short+x, short+x*2, . . . , short+x*k; (4) long, long−x, long−x*2, . . . long−x*k; (4) short, medium, long; (5) long, medium, short; (6) medium, long, short.

The diagrams 300, 400 of FIGS. 3A-3D and 4A correspond to configurations in which the sensor outputs the exposures in the same order for each row. For example, referring to FIG. 4, each of the rows R1 . . . RN outputs the short exposure 402 followed by the long exposure 404 for each frame. However, in some cases, the multiple exposure generator 206 is configured to cause the sensor 200 to output the first and second exposures in a different order depending on the row, providing greater creative flexibility.

Figure 4B:
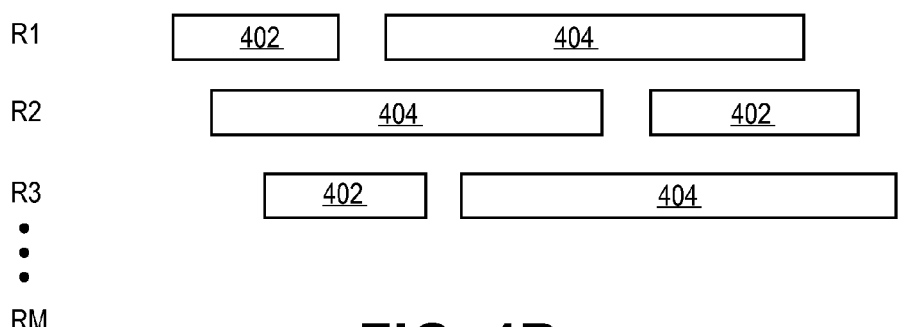

FIG. 4B shows one such example, where the order of the short and long exposures 402, 404 alternates from row to row (or from subset of rows to subset of rows). Accordingly, the first row R1 outputs the short exposure 402 followed by the long exposure 404, the second row R2 outputs the long exposure 404 followed by the short exposure, the third row outputs the short exposure 402 followed by the long exposure 404, and so on. In another similar embodiment, one or more of the integration times for the short exposure and the long exposure for the odd rows are different than the short exposure and the long exposure for the even rows.

Figure 4C:
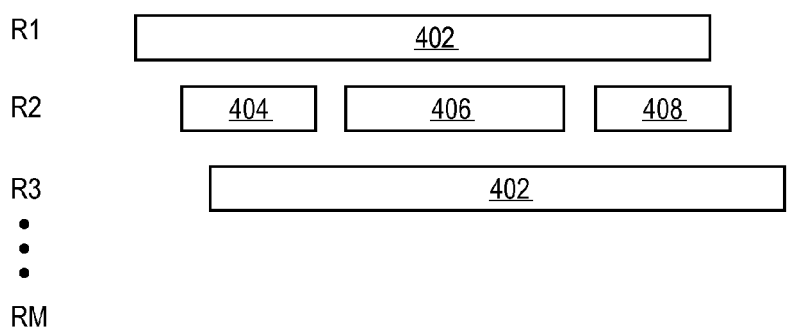

In yet other instances, one or more of the rows capture only a single exposure per frame, while the remaining rows capture multiple exposures. For example, FIG. 4C shows one such case where the odd rows output a single long exposure 402 per frame, while the even rows output three closely-timed exposures (e.g., short, medium, short) 404, 406, 408 per frame. Thus, it can be appreciated that a wide variety of possibilities exist for creating closely-timed exposures.

For the purposes of clarity, the terms "short" and "long" are used herein to distinguish different exposures, such as where one exposure has an integration time relatively shorter than another exposure(s), or shutter speed that is thus relatively longer than the other exposure(s). However, the above-described techniques are compatible with embodiments where other parameters instead of, or in addition to integration time, are manipulated and which affect the degree of exposure. Such parameters can include gain (e.g., analog gain), aperture, and ISO, for example. Thus, depending on the embodiment, where exposures are referred to as being "short" or a "long," it will be appreciated that they may actually be more accurately referred to as "low" or "high." As used herein, the terms "picture element reset time" and "picture element readout time" can refer to one or more of the amount of time it takes to read out a row of picture elements (e.g., pixels), a subset of more than one rows of picture elements, a single picture element, or some other non-row grouping of pixel elements, such as one or more columns of picture elements. In some cases, such as where multiple pixel elements are readout in parallel, for example, the readout time for a particular group (e.g., row or subset of rows of pixel elements) corresponds to the same amount of time as that of a single picture element.

Generating Tracks of Closely-Timed Images Having Multiple Exposure Levels

Figure 5:
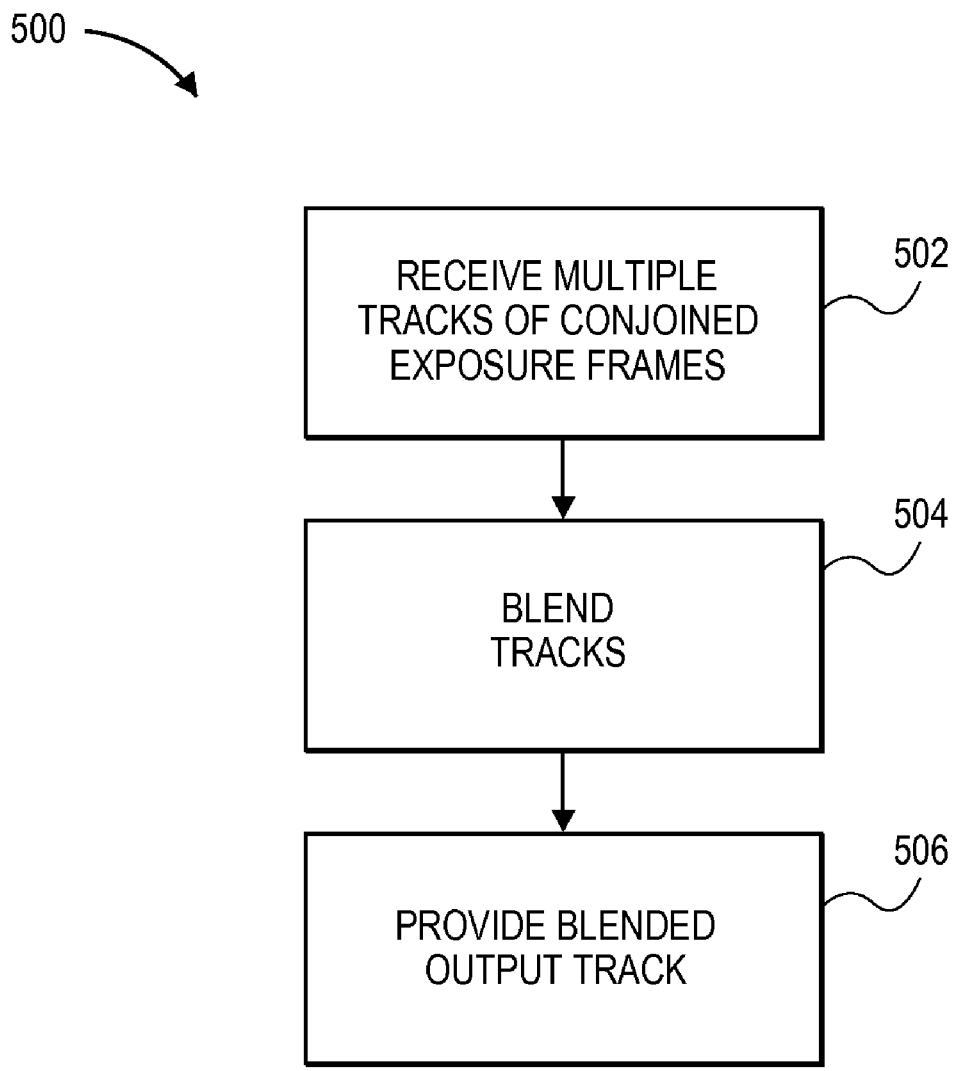
FIG. 5 is a block diagram illustrating an example process for blending tracks of closely timed exposures having different exposure levels in accordance with some embodiments.

FIG. 5 is a flow diagram illustrating an example process 500 for creating a blended output track from multiple tracks of closely-timed exposure frames. As will be described, according to the process 500 and other techniques described herein, the blending module 117 generally receives and processes tracks of closely-timed exposure frames. The blending module 117 may receive and or process the tracks on a frame-by-frame basis, or may operate on any portion of the tracks (e.g., 5, 10, 100, 1000 or more frames, or entire tracks) at any given time.

At block 502, the blending module 117 receives multiple tracks (or portions thereof) of video frames having closely timed exposures (e.g., spaced apart by no more than about 20, 16, 7, 4, or 2 microseconds). The blending module 117 can receive the tracks in a variety of ways. As one example, the blending module 117 resides in software executing on an external computing device. The camera 100 records the closely-timed exposure tracks to the memory device 114 and the tracks are transferred from the memory device 114 to the external computing device, which forwards the recorded tracks to the blending module 117 for processing. As another example, the blending module 117 resides in software or hardware on the camera 100 and receives the recorded tracks directly from the memory device 114 or sensor 112.

At block 504, the blending module 117 processes the received exposures according to the desired (e.g., fixed or user-selectable) algorithm. The blending module 117 may blend together the first and second tracks according to the algorithm, generating the output track based on the first and second (or more) tracks. Some example blending techniques are shown and described with respect to FIGS. 6A-9.

At block 506, the blending module 117 provides the blended output track. For example, where the blending module 117 resides on-camera, it may provide the output image stream frame to the memory 114 for storage. Alternatively, the camera may stream the blended image track to the computing device 102 for external processing and/or storage. Where the blending module 117 operates on only a frame or other portion of each track at a time, the process 500 may then return to block 502, where the blending module 117 receives the first and second exposures for the next frame or group of frames in the respective track.

Figure 6A:
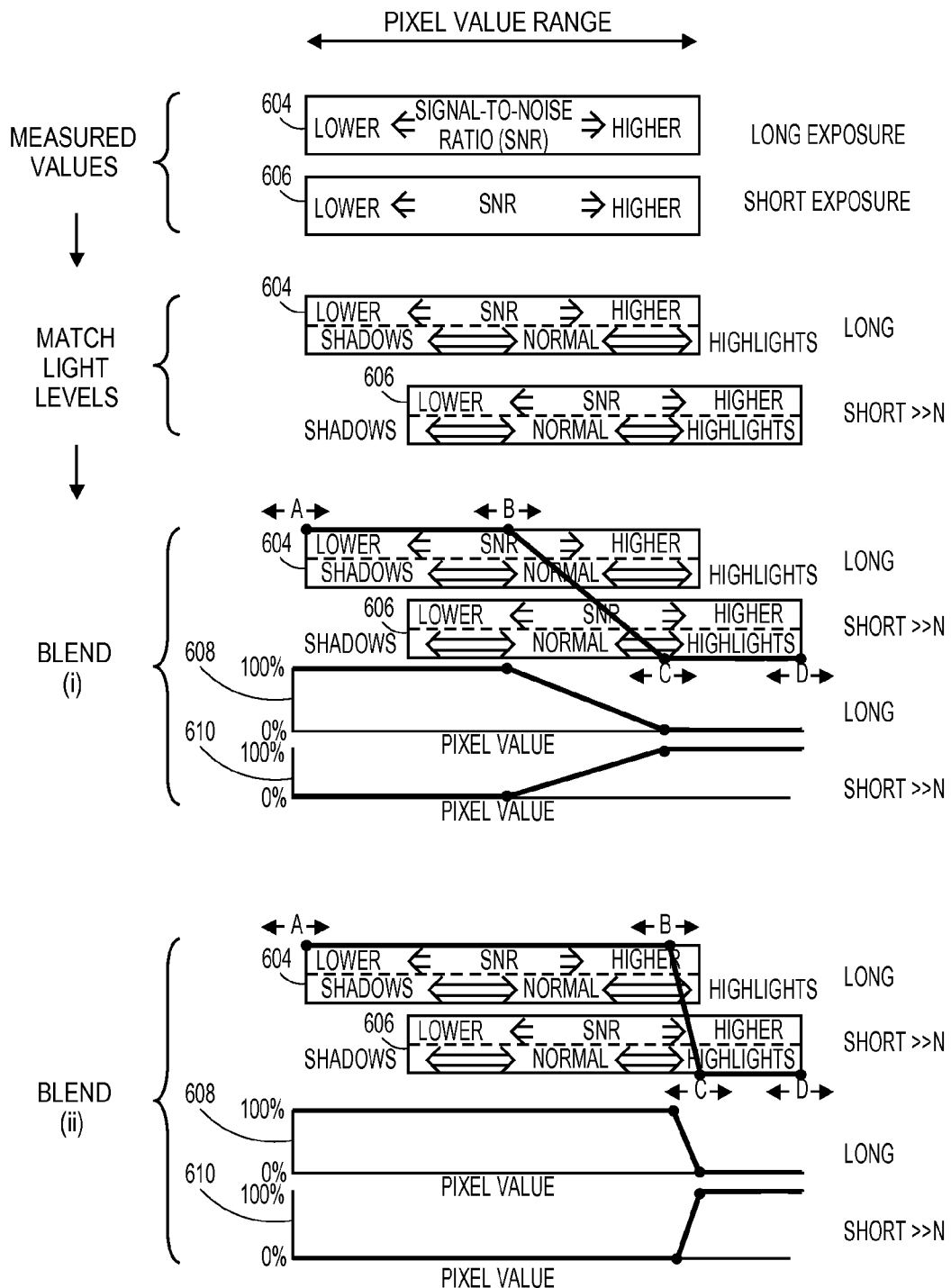
FIGS. 6A-6B illustrate example operations for blending tracks of closely-timed exposures having different exposure levels in accordance with certain embodiments.
Figure 6A:
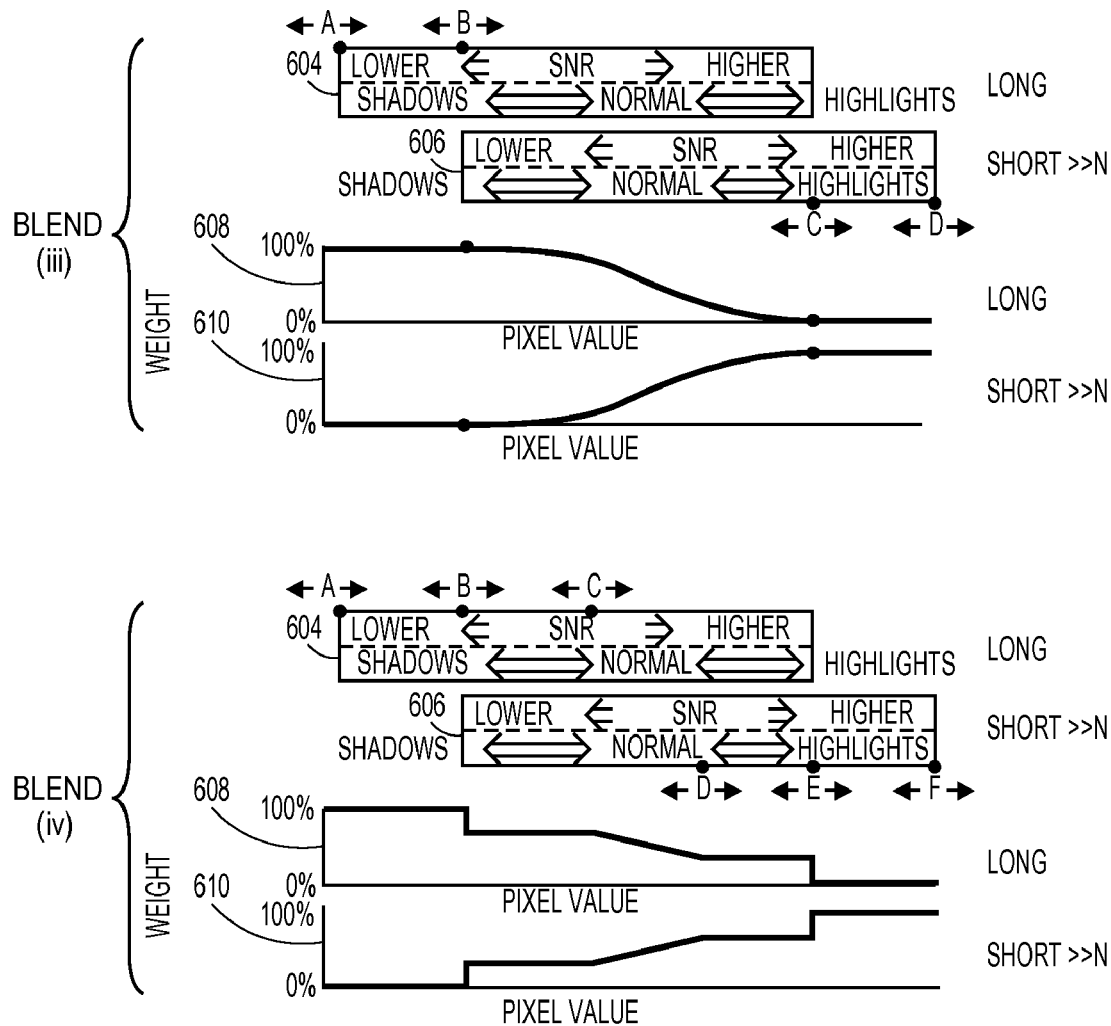
Figure 6B:
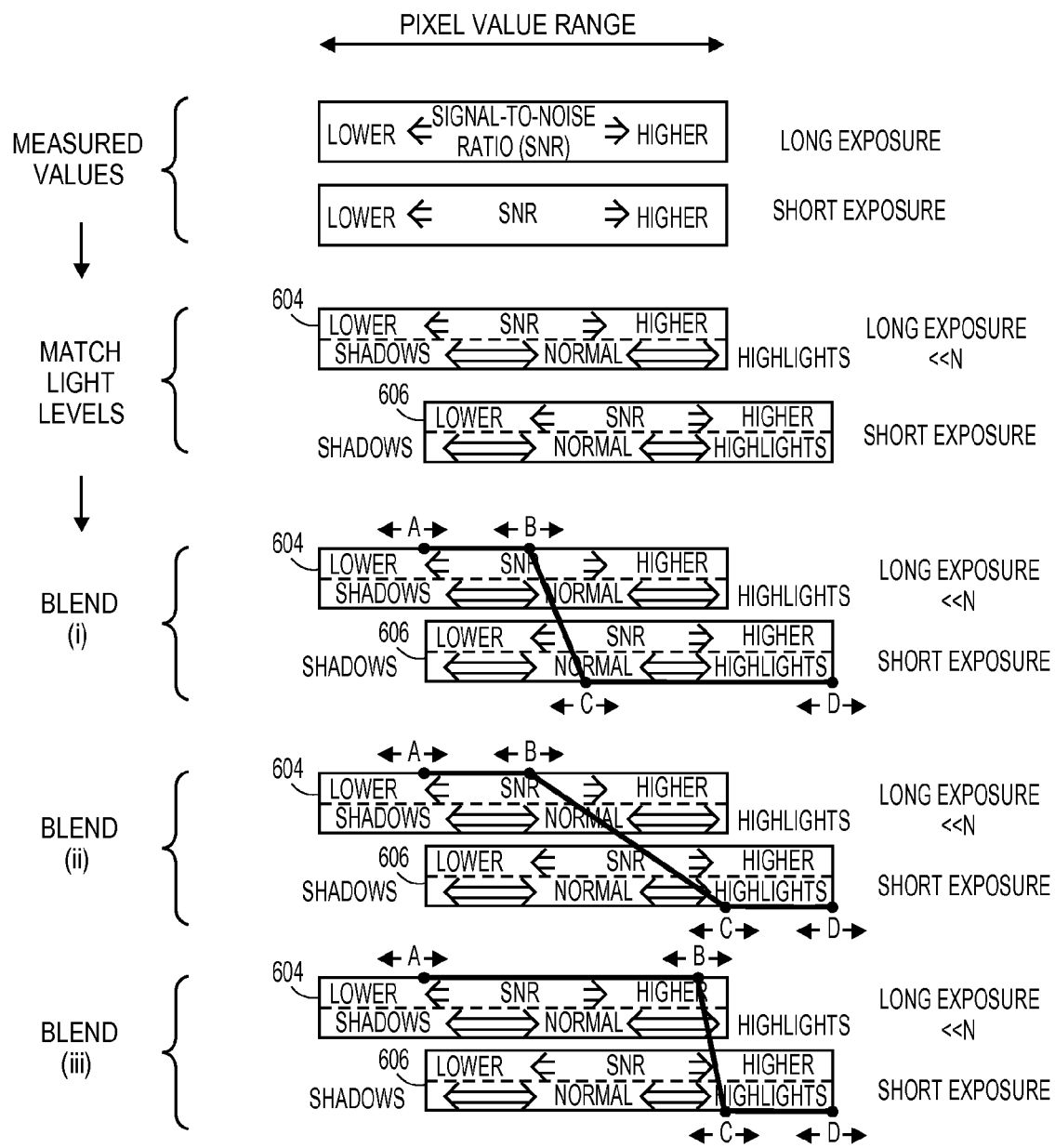

FIGS. 6A-6B illustrate example blending operations. For example, the blending module 117 may be capable of implementing the blending techniques shown in FIGS. 6A-6B. Generally, using these and other blending techniques, the blending module 117 is capable of providing an output track that incorporates desired content from the respective images while discarding undesired image content. The discarded image content can include noisy portions of one or more of the tracks, as well as other portions that are not needed to provide the desired aesthetic effect. Moreover, in some cases the user can select which content to include in the output track, providing improved creative flexibility.

Referring to FIG. 6A, the blending operation 600 represents a scenario in which the camera captures first (e.g., long) 604 and second (e.g., short) 606 closely timed exposures, respectively, for each video frame. The width of the bars representing the long and short exposures 604, 606 generally corresponds to the dynamic range of the sensor, which in turn can correspond to the range of possible pixel values for the sensor 112 (e.g., 0 to 1023 for a 10-bit sensor, 0 to 4095 for a 12-bit sensor, 0 to 65,535 for a 16-bit sensor, etc.). FIG. 6A corresponds to a configuration in which the output track has an expanded bit-depth as compared to the sensor 112, and has an improved dynamic range as compared to either of the individual tracks 604, 606 due to the selective inclusion of content from the two tracks 604, 606.

As shown, for each of the long and short exposures 604, 606 a certain number of captured values will be relatively noisy, having a relatively lower signal-to-noise ratio (SNR). For example, the SNR is relatively low for lower pixel values and gradually increases as the measured pixel values increase. Moreover, the subject scene may include highlights in certain brighter regions. As indicated, the short exposure 606 can capture a significant portion of the highlights because of the shorter integration time, reducing the chance that the highlights will become washed out. On the other hand, as illustrated, the long exposure 604 in some cases does not capture much highlight detail due to the relatively longer integration time, which can lead to wash out.

The scene may also include darker regions including shadows, which can often be juxtaposed with brighter regions. As shown, the long exposure 604 may capture relatively more detail in these regions due to the long integration time. Conversely, the short exposure 606 may capture less detail in these regions due to the shorter integration time.

Also, as shown, the long and short exposures 604, 606 can also include content that corresponds to "normal" portions of the image scene. These portions may not be particularly dark or bright, for example, and can have a generally normal or medium brightness level. The labels used with respect to FIGS. 6A-6B ("shadows," "normal," "highlights") are used only for the purposes of illustrating the blending concepts, and are not limiting. For example, it will be appreciated that the shorter exposure may in some cases capture some amount of shadow content from the image scene. Likewise, the longer exposure in some instances will record some highlight detail.

In the illustrated example, the blending module 117 matches the light levels between the two exposures 604, 606. For example, the blending module 117 can shift the exposures with respect to one another by N bits (e.g., 1, 2, 4, 8, or more bits) prior to blending, or perform some other mathematical operation on one or more of the exposures. In the illustrated example, the short exposure 606 is shifted up by N bits, and is therefore multiplied by a factor of $2^N$. In such cases, the long exposure 604 may be more exposed than the short exposure 606 by a factor of $2^N$. As such, after the shifting, the light levels between the two exposures 604, 606 for corresponding image scene regions more closely match. Also, as shown, the noisiest content in the short exposure 606 is discarded in some cases.

A variety of other processes are possible for adjusting the exposures 604, 606 with respect to one another prior to blending. For example, in some cases, the long exposure 604 is shifted or otherwise adjusted instead of the shorter exposure 606. In one instance, the long exposure 604 is shifted down by N bits instead of shifting the shorter exposure 606 up by N bits. FIG. 3B, discussed below, shows one such embodiment. In other embodiments, the exposures 604, 606 are both shifted. For example, the exposures 604, 606 may be shifted in equal and opposite directions. In yet other cases, the system shifts the exposures 604, 606 in opposite directions but by different values. For example, where the first exposure 604 is exposed by a factor of $2^N$ greater than the second exposure 606, and where N=X+Y, the first exposure 604 may be shifted down by X bits, and the second exposure may be shifted up by Y bits. A variety of other embodiments are possible. For instance, instead of multiplying or dividing the pixel values for the exposures 604, 606, a subtraction, addition or other appropriate operation can be used.

After matching the light levels, the blending module blends together the exposures 604, 606. Three blending algorithms (i)-(iv) are shown for the purposes of illustration.

Referring to the first algorithm (i), the blending module 117 in one embodiment selects the image content of the long exposure 604 that corresponds to the line segment A-B for inclusion in the output track. In one example, the sensor is a 12-bit sensor, the short exposure is shifted up by 2 bits, and the line segment A-B corresponds to pixel values between 0 and 2048. The blending module 117 uses the measured values from long exposure as a reference to determine which pixel values to include in the blended output track. For example, the blending module 117 determines which measured pixels in the long exposure 604 have values from 0 to 2048, and incorporates those pixel values into the corresponding pixels in the blended output image. The values from the long exposure 604 are incorporated substantially directly, unmodified, into the output track while, in some alternative configurations, the blending module 117 performs some mathematical operation on the values prior to incorporation, such as a scaling, shifting or rounding.

The charts 608, 610 shown for the long and short exposures 604, 606, respectively, indicate the percentage of each track included in the output track according to the blending algorithm (i). For example, for pixel values between points A and B, 100% of the output track is composed of content from the long exposure 604.

The blending module 117 may alternatively use the short exposure 606 as a reference to determine which measured pixel values from the long exposure 604 to include in the output track for the portion A-B. In the example case, for instance, the blending module 117 determines which pixels in the short exposure 606 have measured values between 0 and 2048, and selects the measured values for the corresponding pixels in the long exposure 604 to include in the output track. In yet other instances, the blending module 117 uses other types of references. For example, the blending module 117 may calculate some combination (e.g., an average) of the measured values for the short and long exposure 606, 604 for each pixel, and use the calculated value as a reference to determine which pixels from the long exposure 604 to include in the output track. Similarly, while the remaining blending operations (e.g., those along the lines B-C, C-D, and those for the other example blending schemes (ii)-(iv)) are described as using the long exposure 604 as a reference, the short exposure 606, some combination of the short and long exposure 606, 604, or some other type of reference may be employed in those cases as well.

This image content from the long exposure 604 along the line segment A-B may include relatively good detail in the shadows. In some other cases, the blending module 117 blends together the short and long exposures 604, 606 to some degree for values along the line A-B. The amount of blending may be relatively constant, regardless of the input pixel values. Additionally, the blending may be biased in favor of one of the tracks, e.g., the long track 604. For example, the blending module 117 may perform a weighted average of input values from the long track 604 and the short track 606, where the long track has a higher weighting than the short track 606. In some cases, the degree of bias or weighting is controllable by a user, or automatically adjusts depending on the particular mode of operation. Blending algorithm (iv) described below shows an example where weighted averages are used to generate some of the image content in the blended output track.

Referring still to algorithm (i), the next portion of the output track corresponds to a combination of the image content from both the long and short exposures 604, 606 along the slanted line B-C. Moreover, the degree to which the respective exposures 604, 606 are included in the output exposure varies based on the measured input values. This can be in contrast to the portions of the output image corresponding to the line segments A-B and C-D (discussed below). For example, for the segments A-B and C-D, pixels from only one track are selected for inclusion in the output track, or the amount of blending is generally constant (e.g., weighted average), and irrespective of the measured input values.

A variety of operations are possible for the blending of the exposures 604, 606 for the segment B-C. For example, in some embodiments, the amount of the long track 604 included in the output track is greatest at the point B. Conversely, the amount of the short track 606 used in the blending operation is least at the point B. Moreover, for increasing pixel values x between B and C, the amount of the long track 604 included in the output track gradually decreases. Conversely, the amount of the second track 606 included in the output track increases, reaching a maximum at the point C. This is illustrated in the chart 608, which shows the percentage of the long exposure 604 in the output track decreasing linearly from 100 percent to 0 percent for increasing pixel values B to C. Conversely, the chart 610 shows the percentage of the short exposure 606 in the output track increasing linearly from 0 percent to 100 percent from B to C. In an example case, the sensor is a 12-bit sensor, the short exposure 606 is shifted up by 2 bits, B corresponds to a pixel value of 2048, and C corresponds to a pixel value of 4094. Taking as an example a point midway between B and C corresponding to a pixel value of 3071, the blending module 117 determines which pixels in the long exposure 604 (the reference exposure) have a value of 3071. Because the point is midway between B and C, the blending module 117 calculates the values for corresponding pixels in the output track according to the following equation:

$$\text{out\_pixel\_val}=0.5*\text{long\_pixel\_val}*0.5\text{short\_pixel\_val}. \quad \text{(Eq. 8)}$$

A linear interpolation is used for the portion B-C in some instances, and in one case the interpolant is given by:

$$y = 1 + \frac{x-B}{B-C}, \quad \text{(Eq. 9)}$$

where x corresponds to measured input pixel values between B and C, such that $B \leq x \leq C$, for example. In turn, the interpolant may be used to calculate the interpolated output pixel value for each value of x. For instance, the output pixel values may be calculated according to the following equation:

$$\text{out\_pixel\_val}=y*\text{long\_pixel\_val}+(1-y)*\text{short\_pixel\_val} \quad \text{(Eq. 10)}$$

Other types of blending can be used for pixel values corresponding to the line segment B-C. In some cases, and unlike the linear interpolation technique, the amount of the respective exposures 604, 606 included in the blended exposure may not depend on the input values. For example, for this portion of the output track, the blending module 117 may calculate an average of the image content from the long exposure 604 and the image content of the short exposure 606, and include the average in the output track. A variety of other operations can be used instead of an average, including, without limitation, a sum, difference, weighted average, or the like. Blending algorithm (iii) described below incorporates a curved blending function.

In one embodiment, the blending module 117 selects the image content of the short exposure 606 corresponding to the line C-D to complete the output track, and does not blend the exposures for this portion of the output track. For example, referring to 12-bit sensor example, the point C may correspond to a pixel value of 4095, which corresponds to a saturated value for the long exposure 604. The blending module 117 may therefore determine which pixels in the long exposure 604 have a saturated value of 4095 and incorporate into the output image the values from the corresponding pixels in the short exposure 606. As indicated, the image content along the line C-D includes relatively good highlight detail. In other cases, some degree of blending may be used for the portion of the output track corresponding to the segment C-D. For example, for the portion C-D, the blending module 117 may perform a weighted average or other operation that is similar to those described above with respect to the segment A-B. However, the weighted average may be biased in favor of the short track 606 instead of the long track 604 for the portion C-D, unlike for the portion A-B. Algorithm (iv) described below incorporates a blending function along these lines.

Thus, according to such blending techniques, the blending module 117 uses the short exposure 606 to preserve the highlights in the resulting output track, correcting for any possible loss of highlight detail. The track that is made up of the short exposure frames may therefore be referred to as a "highlight protection track" or "highlight correction track," for example.

As indicated by the arrows, one or more of the points A, B, C and D can be adjusted to adjust the blending profile. This can greatly affect both the dynamic range and the motion characteristic of the resulting output track. For example, the lengths of the segments A-B and C-D can significantly alter the dynamic range of the image. Moreover, the motion effect can be tuned by adjusting length of the segment B-C or the particular blending operation (e.g., linear interpolation, weighted average, etc.) that is used on this portion. Specific motion control operations are described in greater detail below with respect to FIG. 8.

Blending algorithm (ii) is similar to blending algorithm (i), except that, as indicated by the shorter line segment B-C, the blending module 117 blends together the long and short exposures 604, 606 for a much smaller portion of the output track. Moreover, as indicated by the relatively long line segment A-B, a larger portion of the long track 604 is included directly in the output track as compared as compared to algorithm (i).

As shown by the charts 608, 610 for algorithm (iii), a blending module 117 implementing algorithm (iii) applies a curve on the measured input values to generate the output track. While a variety of different curves are possible, the blending module 117 in the illustrated example applies an "S" curve over the portion of the output track corresponding to the pixel values between the points B and C. The curve may be a sigmoid curve, or some other type of curve. As with the previous examples, one or more of the points A, B, C, and D can be adjusted to change length of the various segments and corresponding blending profile. In one instance, the curve is applied over the entire output track.

There may additionally be more than three portions (A-B, B-C, C-D) of the output track having discrete blending profiles. Algorithm (iv) shows such a case where there are separate blending profiles for five different portions of the output track: (1) A-B—direct incorporation of the long track 604; (2) B-C—weighted average, where the long track 604 is weighted heavier than short track 606; (3) C-D—linear interpolation between long track 604 and short track 606; (4) D-E—weighted average, wherein the short track 606 is weighted heavier than the long track 604; and (5) E-F—direct incorporation of the short track 606.

Referring now to FIG. 6B, the illustrated blending operation is similar to that of FIG. 6A in that system again captures and blends together first (e.g., long) and second (e.g., long) closely timed exposures 604, 606. However, unlike the operation shown in FIG. 6A, FIG. 6B shows a configuration where the blending module 117 does not expand the bit-width of the output track as compared to the input tracks. Rather, the bit-width remains the same. As one example, the sensor 112 is a 12-bit sensor and thus outputs 12-bit long and short exposures 604, 606, although other bit-widths are possible. The blending module 117 performs light level matching by shifting the long exposure 604 down by a number (e.g., 2, 4, 8, etc.) of bits with respect to the long exposure 604. However, unlike the operation shown in FIG. 4A, the shifted portion is preserved in the embodiment of FIG. 6B. The first and second tracks 604, 606 are then blended together according to the selected algorithm, creating a 16-bit output track. Three example blending algorithms (i), (ii) and (iii) are shown, although a wide variety of other possibilities exist. As shown, the noisiest content in the long exposure 604 is discarded in some cases, while still preserving some detail in the shadows.

While described with respect to a number of specific examples in FIGS. 6A-6B, the blending can occur in a variety of additional manners. For example, the blending can be based on contrast levels, as described below with respect to FIG. 9.

Figure 7:
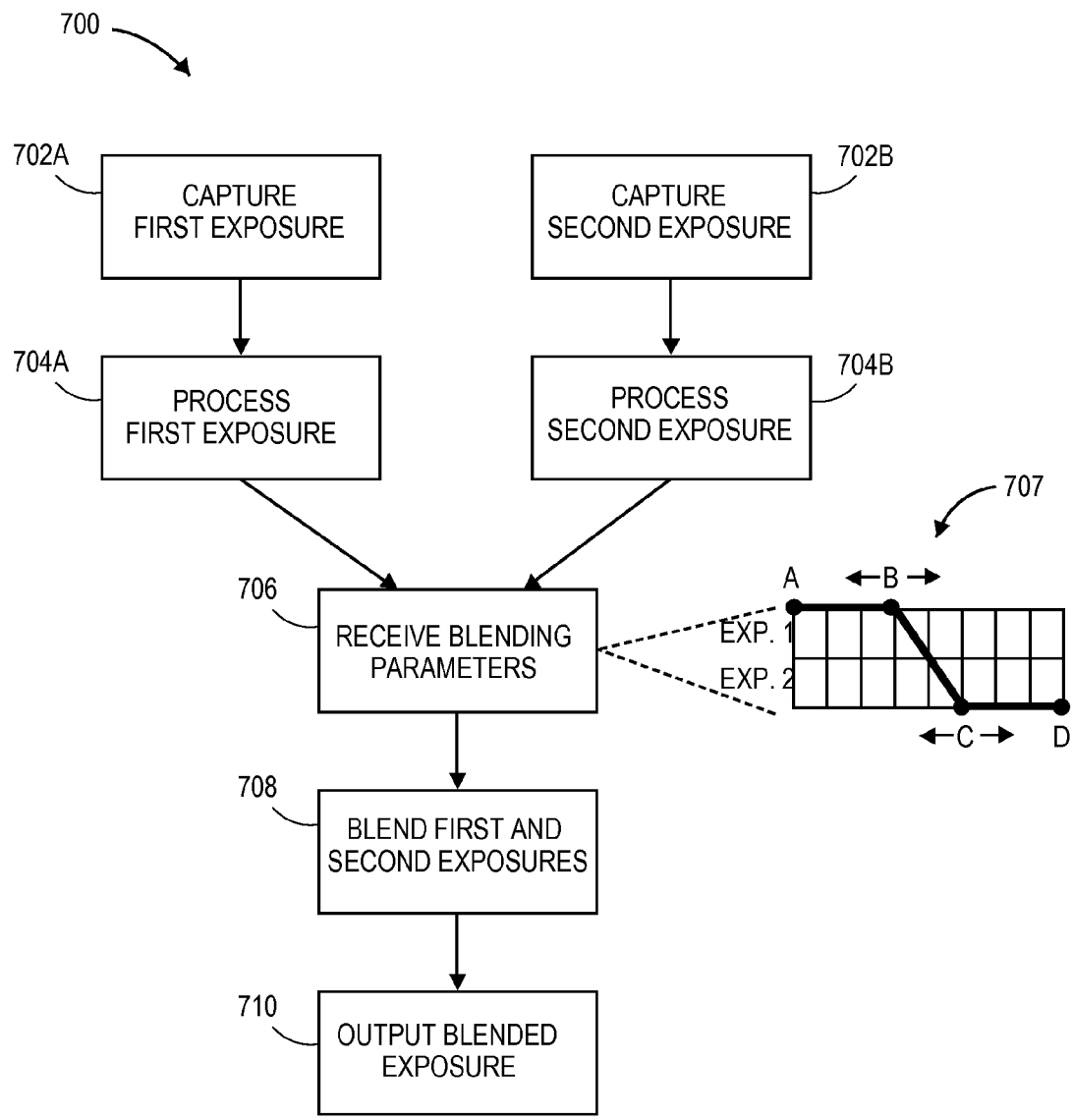
FIG. 7 illustrates another example process for blending tracks having different exposure levels in accordance with some embodiments.

FIG. 7 shows a blending process 700 for creating an output exposure from multiple closely-timed exposures. Although described with respect to single first and second exposures for the purposes of illustration, the operations described below with respect to the process 700 may instead be performed on entire tracks of first and second exposures or portions thereof.

At blocks 702A, 702B, the sensor 112 captures first (e.g., long) and second (e.g., long) exposures. At block 704A, 704B, the blending module 117 or other component processes the captured exposures.

For example, referring to FIGS. 6A-6B, in some cases one or more of the exposures 604, 606 is adjusted before blending, e.g., to match the light levels between the two exposures. In some of these cases, the blending module 117 shifts one or both exposures 604, 606 and therefore multiplies or divides the pixel values by a corresponding factor of two. However, sensor pixels in some cases output non-zero values even when no light is incident on the pixels (e.g., when the lens cap is on the sensor), creating "non-zero black" values. It can desirable to take this into account prior to the blending. For example, multiplying these "non-zero black" values in the light matching process can complicate later processing stages or produce other undesirable results.

Thus, in one embodiment the module 117 subtracts an offset (e.g., a black offset) from the first and/or second exposures prior to the light matching. The module 117 then performs the light matching or other mathematical operation(s) on the exposures, e.g., multiplying each of the exposures by a predetermined factor. Finally, the blending module 117 can add an offset to the first and second exposures, such as a black offset having the same magnitude as the value that was subtracted prior to the light matching.

In some configurations, at block 704A, 704B the blending module performs one or more operations on the first and second exposures to improve the compression of the image data. For example, in one instance, the image processing module 116 combines select (e.g., low) frequency components of wavelets from both the first and second exposures to improve compression efficiency. The image processing module 116 may also implement a pre-emphasis curve one or more of the exposures (e.g., the darker, shorter exposure). Example pre-emphasis functions are described in greater detail in the '967 patent (e.g., with respect to FIGS. 8, 8A, 11 and columns 11-12 of the '967 patent) and are incorporated by reference herein. Such techniques can improve the efficiency or other quality of the compression. For example, in some cases, pre-emphasis or other techniques can avoid or reduce the amount of compression that occurs on lower bits of the particular exposure(s).

At block 706, the blending module 117 receives parameters for use in the blending operation. For example, the blending parameters generally define how the first and second exposures will be combined. In some cases, for example, the system 100 provides an interface to set one or more of the blending parameters. For example, the system 100 displays a graphical user interface (GUI) to the user that the user can interact with to set the parameter(s). The GUI or other interface can be provided via software on a display of an external computer, or may instead be provided on the camera, depending on the configuration.

In one instance, the GUI includes a slider or one or more other icons that the user can manipulate to adjust the blending parameters. The graphic 707 is similar to those shown with respect to the algorithms of FIGS. 6A-6B. Accordingly, the positions of "A," "B," "C," and "D" generally define how to blend the first and second exposures ("EXP. 1," "EXP. 2"). As indicated in FIG. 7, the user in some cases be able to adjust the position of "B" and "C" using the interface, thereby setting how much of the first and second (or more) exposures to include in the resulting output track, and what portions of the tracks should be blended together. In some cases the user can adjust the position of "A" and/or "D" instead of or in addition to "B" and "C." In addition to the illustrated example, a number of other compatible interfaces are possible. Moreover, the interface can allow users to adjust a variety of other parameters.

In another configuration, the user can select a "highlight protection" value, which determines the amount of highlight protection to employ. Referring to FIGS. 6A-6B, the selected "highlight protection" value may generally the exposure (e.g., integration time) of the exposures 606 in the short track. In one embodiment, the user can select a number of stops (e.g., 2, 3, 4, 5, or 6 stops) of highlight protection to include. For example, if the user selects 2 stops of highlight protection, the exposure for the short exposure 606 track will be 2 stops less than that of the long track 604. For example, where the long track 604 exposure value is $\frac{1}{48}$ seconds, the exposure for the short track 606 will be set to $\frac{1}{192}$ seconds.

In another configuration, the system provides the user with a menu of pre-set algorithms which each have a particular creative effect. Each of the pre-set algorithms have pre-determined blending parameters (e.g., "B" and "C" values). The particular pre-set algorithms may also determine what type of processing occurs in blocks 704A, 704B (e.g., linear interpolation, weighted average, "S" curve, etc.) in some cases.

At block 708, the blending module 117 performs the blending operation based on the selected blending parameters. For example, the blending module 117 can perform the blending generally in the manner described above with respect to FIGS. 5-6B. Finally, at block 710, the blending module 117 outputs the blended exposure (or track of exposures). For example, the blended exposures are provided for storage and/or playback to the user.

In some embodiments, the system 100 provides the user with generally real-time feedback. For example, as the user changes one or more blending parameters or selects a different pre-set blending algorithm, the system plays back the blended output track or a portion thereof for user review on a camera or computer monitor. Thus, the user can make adjustments on the fly to achieve the desired visual effect.

Returning to block 708, in some embodiments the blending module 117 blends the closely-timed tracks by determining, according to the selected algorithm, which portions of each track are properly exposed. For example, for each exposure, the blending module 117 flags the properly exposed pixels for inclusion in the combined output image. According to another embodiment, the blending module 117 compares pixels from one exposure to corresponding pixel(s) in the other exposure (s), and according to a predetermined algorithm, calculates the corresponding pixel value in the blended output.

As described, any of the blending techniques can generally be implemented on a frame-by-frame basis, for example, or at some other granularity, and a wide variety of compatible blending techniques are possible. In certain configurations, more than one frame from the first and/or second (or more) tracks are compared or otherwise analyzed in generating the output track. For example, in such cases the blending module 117 compares frames n−w, . . . , n, . . . , n+x from the first track to frames n−y, . . . , n, . . . n+z from the second track to generate frame n in the output image stream, where n is the current output track frame.

Controlling Motion Effect

As discussed, the image capture techniques described herein efficiently use the frame period to provide tracks having different exposures levels within individual frames. The inter-exposure delay is relatively small, resulting in substantially reduced or no temporal gap between the differently exposed tracks. For example, there may be substantially no visual separation between objects in one track as compared to the same objects in another track. Moreover, as discussed, the inter-exposure skew for the individual tracks is relatively minimal. According to certain aspects, the system exploits these and other aspects to control the motion effect in the combined output track, such as the amount or quality of blur, in addition to providing the dynamic range benefits described herein. For example, motion artifacts in the combined output stream can be substantially reduced, removed, or controlled in a desired fashion. Additionally, some techniques described herein reduce or eliminate the amount of motion artifact detection and processing that can be necessary with some conventional approaches.

Figure 8:
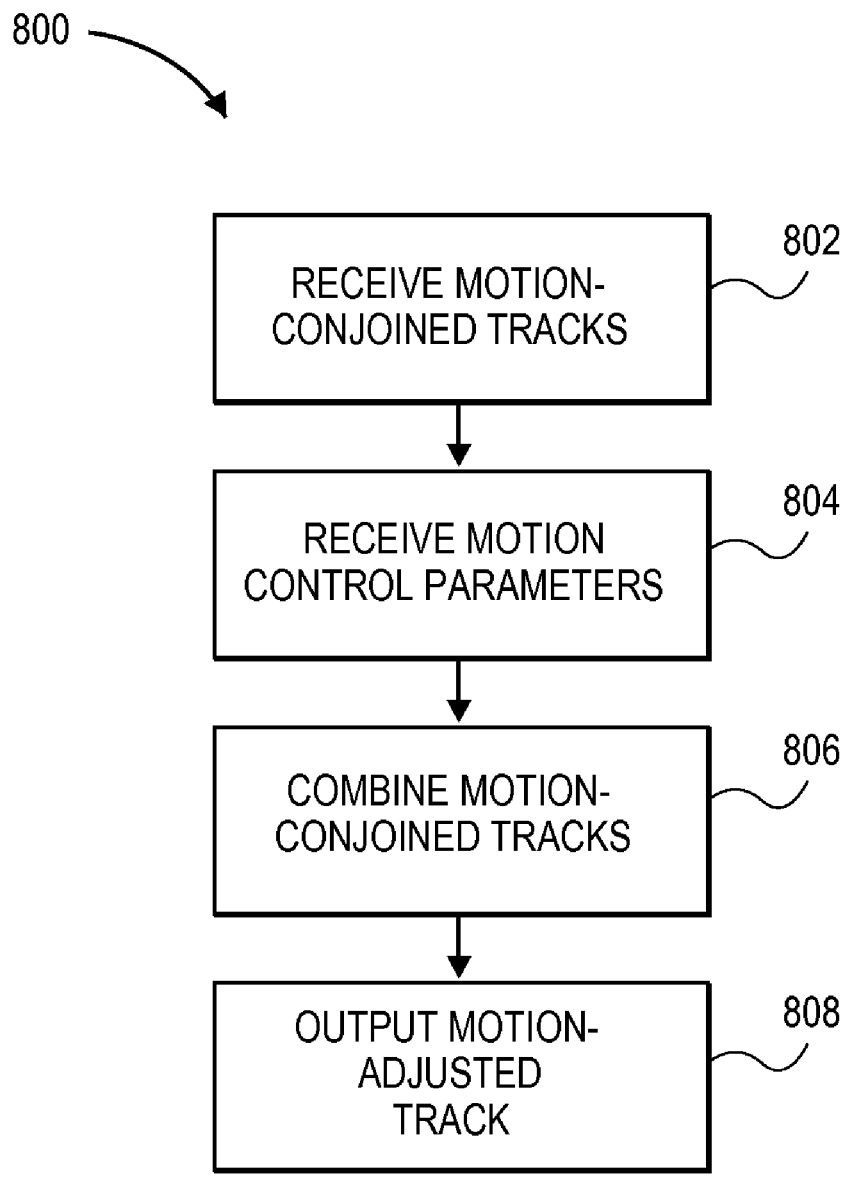
FIG. 8 illustrates an embodiment of a process for blending tracks of closely-timed exposures having different levels of exposure to control motion artifacts.

FIG. 8 shows a process 800 of providing an output image track having controlled motion effect. At block 802, the blending module 117 receives at least two closely-timed tracks, which can be recorded according to any of the techniques described herein. For example, the tracks may be any of those shown and described in FIGS. 3A-6B. At block 804, the blending module 117 receives a set of motion control parameters. These parameters generally define the motion control algorithm that the blending module 117 performs when selectively combining tracks. As with the dynamic range blending parameters (e.g., amount of "highlight protection") described above, the motion control parameters may be user-selectable or fixed, depending on the implementation. In some cases, the user is provided a menu having a list of various motion control techniques to choose from. These may be any of the techniques described below with respect to block 806, or some other technique(s).

At block 806, the process 800 combines the tracks of closely-timed images to create an output image stream having the desired motion effect. A variety of motion control techniques are possible.

Where multiple, tracks of closely-timed images are recorded at different exposure levels, one of the tracks may be relatively blurry, similar to conventional video recordings. For example, significant blurring may be present in relatively long integration time tracks, such as those shown in FIGS. 3A-4C and 6A-6B. However, other tracks may be sharper and include reduced or minimal blurring. For example, the short integration time exposures shown in FIGS. 3A-4C and 6A-6B may be relatively sharper. Typical video recordings (e.g., 24 fps with a 180 degree shutter) show a generally constant blurring for moving objects, without sharper references. However, what the human eye sees when viewing the scene in person is closer to a combination of both the blurred references to the objects as well as discrete, sharper references to the moving objects.

To mimic this effect, in some embodiments, the blending module 117 uses both the more blurry track(s) and the sharper track(s) to control the motion effect, create an output track that includes both the blurred and sharp references to moving objects. For instance, referring again to FIGS. 6A-6B, the amount or quality of the motion effect included in the output track can be controlled by adjusting the blending parameters, such as the positions of A, B, C, D or the type of blending operations used. As one example, a user can control the amount of blurred and sharp references represented in the output track by adjusting the position of B and C, thereby adjusting the length and position of the line segments A-B, B-C, and C-D. In particular, referring to algorithm (i) shown in FIG. 6A, for increasing measured pixel values along the line B-C where the blending module 117 implements an interpolation function, the output track will tend to include a varying mixture of blurred references and sharper references. Specifically, the output track along the line B-C includes an increasingly significant portion of image content from the short track 606 and a correspondingly lesser portion of the long track 604. As such, portions of the output track corresponding to the line segment B-C will include a varying mixture of relatively more blurred references to image scene objects from the long track 604 and relatively sharper references to the same image scene objects from the short track 606. In this manner, the blending module 117 can create an output track that more closely mimics what the human eye would see if watching the scene in person. The system or a user can additionally adjust the positions of B and C to modify the effect.

In addition, gradually shifting the relative contributions of the larger track 604 and the shorter track 606 (or vice versa) in an incremental manner, such as by using linear interpolation or a curve function, can help limit or prevent any banding or other undesirable visual artifacts that may occur from a more abrupt change in the relative contributions of the two tracks. In some cases, the gradual shifting can also help to reduce the amount of lower SNR image content that is incorporated in the output track (e.g., from the shorter track 606), improving image quality.

In another example, the blending module 117 implements a weighted average of the long and short exposures 604, 606 for portions of the output track along the line B-C. For example, a $^{50}/_{50}$ weighted average may result in an output track having a generally even mixture of sharper content from the short track 606 and blurred content from the longer track 604. The weightings can be adjusted to tailor the effect. In one embodiment, the system provides the user with an interface to control how much of the motion effect from each track to include in the resulting output track. Generally, the system can employ a wide variety of other functions instead of or in combination with the illustrated ones.

In yet further configurations, the blending module 117 can set the relative weighting of the short and long tracks 604, 606 in the output track based on a contrast level. For instance, the blending module 117 processes measured input values of the long track 604, the short track 606, or a combination thereof to determine a contrast level in particular image regions, and uses the determined contrast level to select the relative weighting between the long track 604 and the short track 606 for pixels within those image regions. For example, the blending module 117 applies a high-pass filter on the image data for the short track 606 (and/or long track 606) to determine high contrast regions. For relatively high contrast regions, the blending module 117 weights the short track 606 heavier than the long track 604 in the output track. For relatively lower contrast regions, the blending module 117 may weight the long track 604 higher, or weight the two tracks equally. In this manner, the resulting output track can include both sharp references to moving objects (from the high contrast regions of the short track 606) and blurred references to moving objects (from adjacent, relatively lower contrast regions of the long track 604). The blending module 117 can identify lower contrast regions instead of, or in addition to, higher contrast regions, by performing a low pass filter on the long and/or short exposures 604, 606, for example.

Moreover, for portions of the output track corresponding to the line segments A-B and/or C-D, a user in some embodiments adjusts the motion effect by controlling the amount of each image to include in the output track. For example, the user can adjust the bias value in a weighted average blend operation to control the weight each input track is given in the blending operation. For example, the system may provide a slider, other GUI, or another input mechanism to allow the user tailor the effect.

In another embodiment, the blending module 117 is configured to blend the tracks together in a manner that more closely matches the motion effect of a traditional camera (e.g., 24 fps with a 180 degree shutter). For example, a customized motion estimation algorithm may be used to match the motion blur of one or more of the tracks to that of a traditional camera. For example, referring to FIG. 3A, the blur in the shorter integration time track 302 may be increased to match that of the longer integration time track 304. In one embodiment, the blur matching is done before the blending of the exposures, although it can be done afterwards in other implementations.

At block 908, the blending module 117 outputs the motion-adjusted track for playback or further processing.

Terminology/Additional Embodiments

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. In some embodiments, the algorithms disclosed herein can be implemented as routines stored in a memory device. Additionally, a processor can be configured to execute the routines. In some embodiments, custom circuitry may be used.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of obtaining video image data using a digital imaging sensor comprising a picture element array of rows and columns, the method comprising:

using a plurality of picture elements in the picture element array to capture light corresponding to a first image at a first exposure level;

using the plurality of picture elements in the picture element array to capture light corresponding to a second image at a second exposure level different than the first exposure level;

converting the light captured by the plurality of picture elements for the first image to digital measurements; and converting the light captured by the plurality of picture elements for the second image to digital measurements, wherein individual picture elements complete capturing the light corresponding to the first image prior to when those individual picture elements begin to capture the light corresponding to the second image, further wherein the step of using the plurality of picture elements in the picture element array to capture light corresponding to the second image at the second exposure level begins prior to the completion of the step of converting the light captured by the plurality of picture elements for the first image to digital measurements, further wherein the step of converting the light captured by the plurality of picture elements for the first image to digital measurements substantially completes prior to the beginning of the step of converting light captured by the plurality of picture elements for the second image to digital measurements, further wherein the amount of time that elapses from between when the step of capturing the light corresponding to the first image completes to when the step of capturing the light corresponding to the second image completes is greater than the amount of time from between completing readout of a first of the picture elements for the first image to completing readout of substantially all of the picture elements for the first image, and further wherein first and second images are captured for a plurality of video frames to create a first track of first images and to create a second track of second images, where combined images are created for the plurality of video frames.

2. The method of claim 1, wherein the plurality of picture elements form subsets of one or more rows of pixels, and wherein the pixels in the respective subsets are captured and converted as a group.

3. The method of claim 1, wherein, for a particular picture element of the plurality of picture elements, there is an inter-exposure delay of less than approximately 100 picture element reset times between converting light captured by the particular picture element for the first image and beginning to capture light corresponding to the second image at the second exposure level by the particular picture element.

4. The method of claim 3, wherein the inter-exposure delay is less than approximately 10 picture element reset times.

5. The method of claim 4, wherein the inter-exposure delay is approximately one picture element reset time.

6. The method of claim 1, wherein the first and second images are captured using a rolling shutter technique, wherein the capturing of light by a particular subset of one or more rows of picture elements begins after the capturing of light by the preceding subset of one or more rows of picture elements begins.

7. The method of claim 6, wherein an inter-picture element delay from when the capturing of light by a particular subset of one or more rows of picture elements begins and when the capturing of light by the subsequent subset of one or more rows of picture elements begins is less than approximately two picture element read out times.

8. The method of claim 7, wherein the inter-picture element delay is approximately one picture element readout time.

9. A method of blending video image data corresponding to multiple exposures and captured using a digital imaging sensor comprising a picture element array of rows and columns, comprising:

obtaining first image data corresponding to a first image and derived from digital measurements that were converted from light captured by a plurality of picture elements in the picture element array at a first exposure level;

obtaining second image data corresponding to a second image and derived from digital measurements that were converted from light captured by the plurality of picture elements in the picture element array at a second exposure level different than the first exposure level; and using one or more processors to selectively combine the first image data and the second image data to create combined image data corresponding to a combined image, wherein individual picture elements completed capturing the light corresponding to the first image prior to when those individual picture elements began to capture the light corresponding to the second image, further wherein capturing of the light corresponding to the second image at the second exposure level began prior to the completion of converting the light captured by the plurality of picture elements for the first image to digital measurements, further wherein converting the light captured by the plurality of picture elements for the first image to digital measurements substantially completed prior to the beginning of converting the light captured by the plurality of picture elements for the second image to digital measurements, further wherein the amount of time that elapsed from between when capturing the light corresponding to the first image completed to when capturing the light corresponding to the second image completed is greater than the amount of time from between completing readout of a first of the picture elements for the first image to completing readout of substantially all of the picture elements for the first image, and further wherein first and second images are captured for a plurality of video frames to create a first track of first images and to create a second track of second images, where combined images are created for the plurality of video frames.

10. The method of claim 9, wherein an exposure time for the second image is longer than an exposure time for the first image and the combined image has a wider dynamic range than either of the first and second images.

11. The method of claim 9, wherein the first image has a first bit-depth, the second image has a second bit-depth, and the combined image has a bit-depth that is greater than either of the first or second bit-depths.

12. The method of claim 9, further comprising blending together content from the first image with content from the second image for at least some of the combined image, wherein portions of the captured image scene represented by the blended content include first references from the first image to one or more image scene objects and second references from the second image to the same image scene objects, the second references depicting significantly more motion blur than the first references.

13. The method of claim 9, further comprising blending together content from the first image with content from the second image for at least some of the combined image by varying the relative amounts of first image content and second image content included in the blended content in response to magnitudes of picture element values from one or more of the first image and the second image.

14. The method of claim 13, wherein said varying comprises performing a linear interpolation function.

15. The method of claim 13, wherein said varying comprises performing a weighted averaging function.

16. The method of claim 13, further comprising adjusting the amount of blended content to include in the combined image in response to user input.

17. The method of claim 13, wherein said blending together content comprises discarding relatively low signal-to-noise content from one or more of the first and second images.

18. An imaging system, comprising: a plurality of picture elements arranged in an array; and
control circuitry configured to:
capture light corresponding to a first image at a first exposure level with the plurality of picture elements in the picture element array;
capture light corresponding to a second image at a second exposure level different than the first exposure level with the plurality of picture elements in the picture element array;
convert the light captured by the plurality of picture elements for the first image to digital measurements; and
convert light captured by the plurality of picture elements for the second image to digital measurements,
wherein individual picture elements complete capturing the light corresponding to the first image prior to when those individual picture elements begin to capture the light corresponding to the second image,
further wherein the control circuitry begins the capturing of the light corresponding to the second image at the second exposure level prior to the completion of the converting of the light captured for the first image to digital measurements,
further wherein the control circuitry substantially completes the converting of the light for the first image to digital measurements prior to the beginning of the converting of the light for the second image to digital measurements,
further wherein the amount of time that elapses from between when capturing the light corresponding to the first image completes to when capturing the light corresponding to the second image completes is greater than the amount of time from between completing readout of a first of the picture elements for the first image to completing readout of substantially all of the picture elements for the first image,
further wherein first and second images are captured for a plurality of video frames to create a first track of first images and to create a second track of second images, where combined images are created for the plurality of video frames.

19. A system for blending video image data corresponding to multiple exposures and obtained using a digital imaging sensor comprising a picture element array of rows and columns, the system comprising:
one or more processors;
an interface configured to:
obtain first image data corresponding to a first image and derived from digital measurements that were converted from light captured using a plurality of picture elements in a picture element array of a digital imaging sensor at a first exposure level;
obtain second image data corresponding to a second image and derived from digital measurements that were converted from light captured using the plurality of picture elements in the picture element array at a second exposure level different than the first exposure level; and
a blending module executing on the one or more processors and configured to selectively combine the first image data and the second image data to create combined image data corresponding to a combined image,
wherein individual picture elements completed capturing the light corresponding to the first image prior to when those individual picture elements began to capture the light corresponding to the second image,
further wherein the capturing of the light corresponding to the second image at the second exposure level began prior to the completion of converting the light captured by the plurality of picture elements for the first image to digital measurements,
further wherein the converting the light captured by the plurality of picture elements for the first image to digital measurements substantially completed prior to the beginning of the of converting the light captured by the plurality of picture elements for the second image to digital measurements,
further wherein the amount of time that elapsed from between when capturing the light corresponding to the first image completed to when capturing the light corresponding to the second image completed is greater than the amount of time from between completing readout of a first of the picture elements for the first image to completing readout of substantially all of the picture elements for the first image, and
further wherein first and second images are captured for a plurality of video frames to create a first track of first images and to create a second track of second images, where combined images are created for the plurality of video frames.

* * * * *

UNITED STATES PATENT AND TRADEMARK OFFICE
CERTIFICATE OF CORRECTION

PATENT NO. : 8,159,579 B2  
APPLICATION NO. : 13/279071  
DATED : April 17, 2012  
INVENTOR(S) : James H. Jannard et al.

Page 1 of 1

It is certified that error appears in the above-identified patent and that said Letters Patent is hereby corrected as shown below:

In the Specifications:

In Column 8, Line 54, Change "example"4 k"" to --example "4 k"--.

In Column 13, Line 33, After "the" delete "a".

In Column 15, Line 50, Change "and or" to --and/or--.

In Column 19, Line 24 (Approx.), After

"$out\_pixel\_val = y * long\_pixel\_val + (1 - y) * short\_pixel\_val$"

insert --.--.

In the Claims:

In Column 30, Line 34 (Approx.), In Claim 19, after "of" delete "the of".

Signed and Sealed this  
Twenty-fifth Day of June, 2013

Teresa Stanek Rea  
*Acting Director of the United States Patent and Trademark Office*